US012581502B2

(12) United States Patent
Kung et al.

(10) Patent No.: US 12,581,502 B2
(45) Date of Patent: Mar. 17, 2026

(54) METHOD AND APPARATUS FOR BEAM SELECTION AND REPORTING IN A WIRELESS COMMUNICATION SYSTEM

(71) Applicant: ASUSTek Computer Inc., Taipei City (TW)

(72) Inventors: Yi-Hsuan Kung, Taipei City (TW); Yu-Hsuan Guo, Taipei City (TW); Chun-Wei Huang, Taipei City (TW)

(73) Assignee: ASUSTek Computer Inc., Taipei City (TW)

( * ) Notice: Subject to any disclaimer, the term of this patent is extended or adjusted under 35 U.S.C. 154(b) by 389 days.

(21) Appl. No.: 17/903,841

(22) Filed: Sep. 6, 2022

(65) Prior Publication Data

US 2023/0171788 A1    Jun. 1, 2023

Related U.S. Application Data

(60) Provisional application No. 63/243,596, filed on Sep. 13, 2021, provisional application No. 63/243,571, filed on Sep. 13, 2021, provisional application No. 63/243,675, filed on Sep. 13, 2021.

(51) Int. Cl.
*H04W 72/232* (2023.01)
*H04B 7/06* (2006.01)
*H04L 5/00* (2006.01)

(52) U.S. Cl.
CPC ........ *H04W 72/232* (2023.01); *H04B 7/0695* (2013.01); *H04L 5/0053* (2013.01)

(58) Field of Classification Search
CPC .. H04B 7/0695; H04B 7/0696; H04B 7/0408; H04B 7/0617; H04B 7/088; H04B 17/24; H04L 5/0053; H04W 24/08; H04W 72/046; H04W 72/232

USPC .......................................................... 370/329
See application file for complete search history.

(56) References Cited

U.S. PATENT DOCUMENTS

| | | | |
|---|---|---|---|
| 2020/0288479 A1* | 9/2020 | Xi | H04B 7/088 |
| 2022/0038168 A1* | 2/2022 | Ma | H04L 1/203 |
| 2022/0070704 A1* | 3/2022 | Khoshnevisan | H04L 27/2602 |
| 2022/0078848 A1* | 3/2022 | Hu | H04B 7/0695 |

(Continued)

FOREIGN PATENT DOCUMENTS

| | | |
|---|---|---|
| CN | 109983820 A | 7/2019 |
| CN | 110475360 A | 11/2019 |

OTHER PUBLICATIONS

Office Action to the corresponding Korean patent application rendered by the Korean Intellectual Property Office (KIPO) on Nov. 8, 2024, 13 pages (including English translation).

(Continued)

*Primary Examiner* — Rownak Islam
(74) *Attorney, Agent, or Firm* — Skaar Ulbrich Macari, P.A.

(57) ABSTRACT

Methods, systems, and apparatuses are provided for beam selection and reporting in a wireless communication system to enhance latency reduction for Downlink (DL)/Uplink (UL) beam selection and activation. A User Equipment (UE) can monitor Physical Downlink Control Channel (PDCCH) on multiple Control Resource Sets (CORESETs) in a first cell, transmit a signaling to a network, wherein the signaling indicates information of a first beam, and monitor PDCCH on the multiple CORESETs via the first beam based on the signaling.

20 Claims, 20 Drawing Sheets

(56)  References Cited

U.S. PATENT DOCUMENTS

2024/0048333 A1 *  2/2024  Bhamri  ................ H04B 7/0695
2024/0236722 A1 *  7/2024  Yuan  .................... H04B 7/0639

OTHER PUBLICATIONS

CATT, R1-1715801, Details of beam management, 3GPP TSG RAN WG1 #AH, 3GPP Server Release Date (Sep. 12, 2017), 10 pages.
Lenovo et al., R1-2005823, Enhancements on beam management for multi-TRP, 3GPP TSG RAN WG1 #102-E, 3GPP Server Release Date (Aug. 7, 2020), 4 pages.
Office Action to the corresponding Chinese patent application rendered by the China National Intellectual Property Administration (CNIPA) on Mar. 31, 2025, 7 pages.

* cited by examiner

*300*

| Serving Cell ID | |
|---|---|
| CORESETID1 | TCI state ID |

FIG. 15

| Serving Cell ID | |
|---|---|
| CORESETID1 | TCI state ID 1 |
| CORESETID2 | TCI state ID 2 |

| Serving Cell ID | |
|---|---|
| CORESETID1 | TCI state ID 1 |
| CORESETID2 | |

FIG. 15A

| Serving Cell ID1 | |
|---|---|
| CORESETID1 | TCI state ID 1 |
| CORESETID2 | TCI state ID 2 |
| Serving Cell ID2 | |
| CORESETID3 | TCI state ID 3 |

FIG. 15B

| Serving Cell ID1 | BWP ID 1 |
|---|---|
| CORESETID1 | TCI state ID 1 |
| CORESETID2 | TCI state ID 2 |
| Serving Cell ID1 | BWP ID 2 |
| CORESETID3 | TCI state ID 3 |

FIG. 15C

| Serving Cell ID | |
|---|---|
| CORESETpool index 1 (TRP identifier) | TCI state ID 1 |
| CORESETpool index 2 (TRP identifier) | TCI state ID 2 |

FIG. 15D

| Serving Cell ID |
|---|
| TCI state ID 1 |

FIG. 15E

| Serving Cell ID | | BWP ID | |
|---|---|---|---|
| T4 | T3 | T2 | T1 |
| ... | ... | ... | ... |
| $T_{N+3}$ | $T_{N+2}$ | $T_{N+1}$ | $T_N$ |

FIG. 16

| | | Serving Cell ID | BWP ID |
|---|---|---|---|
| C0 | | TCI state id 1 | |
| | | TCI state id 2 | |
| C1 | | TCI state id 3 | |
| | | TCI state id 4 | |
| C2 | | TCI state id 5 | |

FIG. 16A

| Serving Cell ID | BWP ID | Codepoint id |
|---|---|---|
| C0 | TCI state id 1 | |
| | TCI state id 2 | |

FIG. 16B

| Serving Cell ID | | BWP ID |
| --- | --- | --- |
| C1 | PUCCH resource ID 1 | |
| | TCI state id 1 / Spatial relation info ID 1 | |
| | TCI state id 2 / Spatial relation info ID 2 | |
| C2 | PUCCH resource ID 2 | |
| | TCI state id 3 / Spatial relation info ID 3 | |

FIG. 17

| Serving Cell ID | | | | | | | BWP ID |
| --- | --- | --- | --- | --- | --- | --- | --- |
| C1 | | | PUCCH resource ID 1 | | | | |
| S7 | S6 | S5 | S4 | S3 | S2 | S1 | S0 |

FIG. 17A

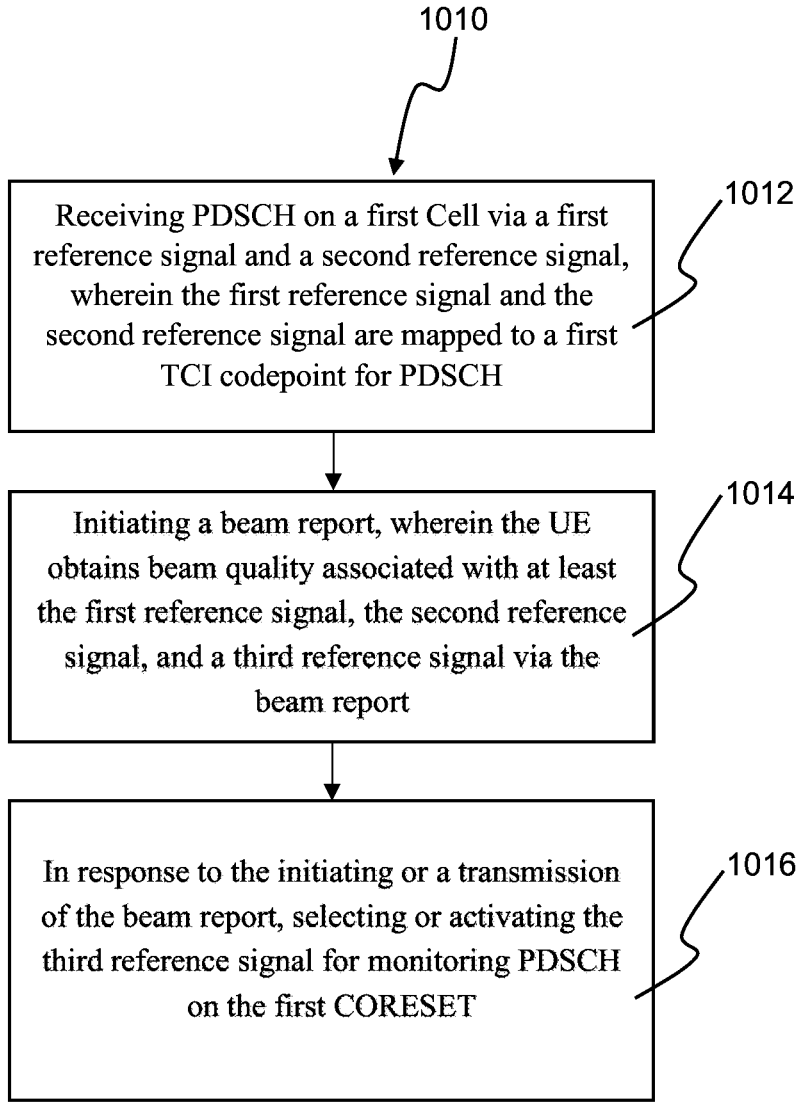

1010

Receiving PDSCH on a first Cell via a first reference signal and a second reference signal, wherein the first reference signal and the second reference signal are mapped to a first TCI codepoint for PDSCH

1012

Initiating a beam report, wherein the UE obtains beam quality associated with at least the first reference signal, the second reference signal, and a third reference signal via the beam report

1014

In response to the initiating or a transmission of the beam report, selecting or activating the third reference signal for monitoring PDSCH on the first CORESET

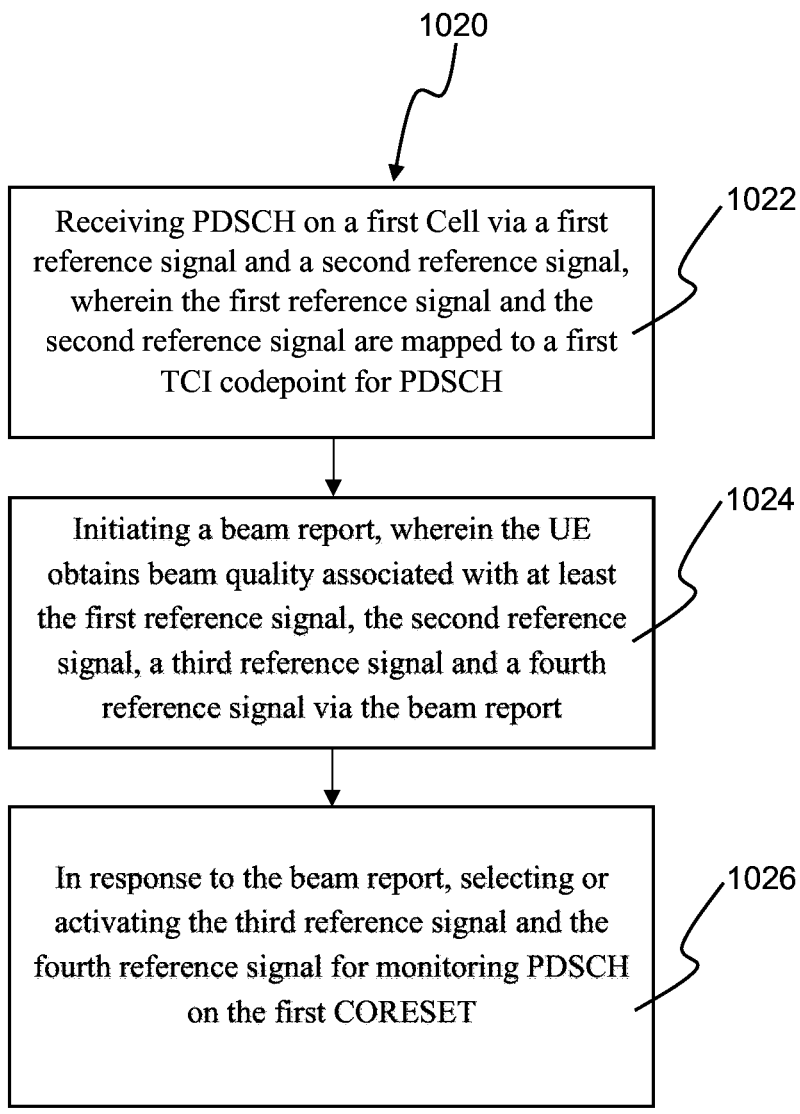

1020

Receiving PDSCH on a first Cell via a first reference signal and a second reference signal, wherein the first reference signal and the second reference signal are mapped to a first TCI codepoint for PDSCH

1022

Initiating a beam report, wherein the UE obtains beam quality associated with at least the first reference signal, the second reference signal, a third reference signal and a fourth reference signal via the beam report

1024

In response to the beam report, selecting or activating the third reference signal and the fourth reference signal for monitoring PDSCH on the first CORESET

Monitoring PDCCH on at least one
CORESET via a second beam in a first cell

1052

Transmitting a signaling to a network, wherein
the signaling indicates information of a first
beam and indicates the at least one CORESET
or information of the second beam

1054

Monitoring PDCCH on the at least one
CORESET via the first beam based on the
signaling

1056

METHOD AND APPARATUS FOR BEAM SELECTION AND REPORTING IN A WIRELESS COMMUNICATION SYSTEM

CROSS-REFERENCE TO RELATED APPLICATIONS

The present Application claims priority to and the benefit of U.S. Provisional Patent Application Ser. No. 63/243,571, filed Sep. 13, 2021, U.S. Provisional Patent Application Ser. No. 63/243,596, filed Sep. 13, 2021, and U.S. Provisional Patent Application Ser. No. 63/243,675, filed Sep. 13, 2021; with each of the referenced applications and disclosures fully incorporated herein by reference.

FIELD

This disclosure generally relates to wireless communication networks and, more particularly, to a method and apparatus for beam selection and reporting in a wireless communication system to enhance latency reduction for Downlink (DL)/Uplink (UL) beam selection and activation.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for beam selection and reporting in a wireless communication system to enhance latency reduction for Downlink (DL)/Uplink (UL) beam selection and activation.

In various embodiments, a method of a User Equipment (UE) can comprise monitoring Physical Downlink Control Channel (PDCCH) on multiple Control Resource Sets (CORESETs) in a first cell, transmitting a signaling to a network, wherein the signaling indicates information of a first beam, and monitoring PDCCH on the multiple CORESETs via the first beam based on the signaling.

In various embodiments, a method of a UE can comprise monitoring PDCCH on at least one CORESET via a second beam in a first cell, transmitting a signaling to a network, wherein the signaling indicates information of a first beam and indicates the at least one CORESET or information of the second beam, and monitoring PDCCH on the at least one CORESET via the first beam based on the signaling.

BRIEF DESCRIPTION OF THE DRAWINGS

FIG. 15 shows an example for reporting selection/activation of beam(s) for PDCCH (e.g., a PDCCH beam selection report), in accordance with embodiments of the present invention.

FIG. 15A shows an example where a UE could report more than one CORESET for a PDCCH, in accordance with embodiments of the present invention.

FIG. 15B shows an example where a UE could report more than one Serving Cell and more than one CORESET for multiple PDCCHs in different Cells, in accordance with embodiments of the present invention.

FIG. 15C shows an example where a UE could report more than one BWP for a Serving Cell (via indicating BWP ID), in accordance with embodiments of the present invention.

FIG. 15D shows an example where a UE could report one or more CORESET pool index, in accordance with embodiments of the present invention.

FIG. 15E is an example where a UE may not report CORESET id or CORESET pool index for activation/selection of beams for a Cell, in accordance with embodiments of the present invention.

FIG. 16 shows an example for reporting selection/activation of beam(s) for PDSCH (e.g., a PDSCH beam selection report), in accordance with embodiments of the present invention.

FIG. 16A shows an example where the beam selection report could indicate one or two activated/selected beam for each activated TCI state codepoint, in accordance with embodiments of the present invention.

FIG. 16B shows an example where the beam selection report could contain or indicate a codepoint id, in accordance with embodiments of the present invention.

FIG. 17 shows an example for reporting PUCCH beam activation/selection, wherein the beam selection report could indicate one or two activated/selected beam for each PUCCH resource, in accordance with embodiments of the present invention.

FIG. 17A shows an example where the beam selection report could contain a bitmap (S1 to S7) indicating activated beam(s) associated with PUCCH resource ID1, in accordance with embodiments of the present invention.

Figure 18:
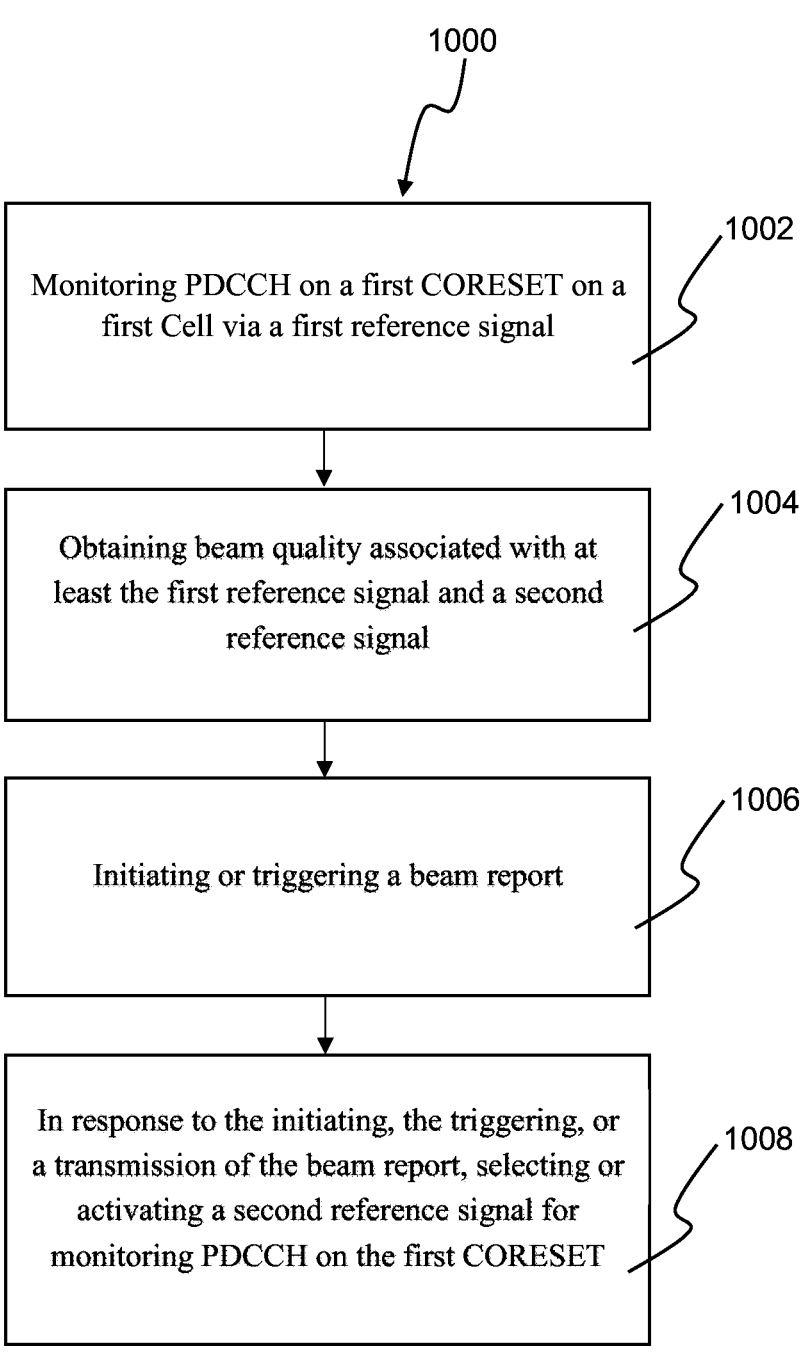

FIG. 18 is a flow diagram of a method of a UE comprising monitoring PDCCH on a first CORESET on a first Cell via a first reference signal, in accordance with embodiments of the present invention.

FIG. 19 is a flow diagram of a method of a UE comprising receiving PDSCH on a first Cell via a first reference signal and a second reference signal, in accordance with embodiments of the present invention.

FIG. 20 is a flow diagram of a method of a UE comprising receiving PDSCH on a first Cell via a first reference signal and a second reference signal, in accordance with embodiments of the present invention.

Figure 21:
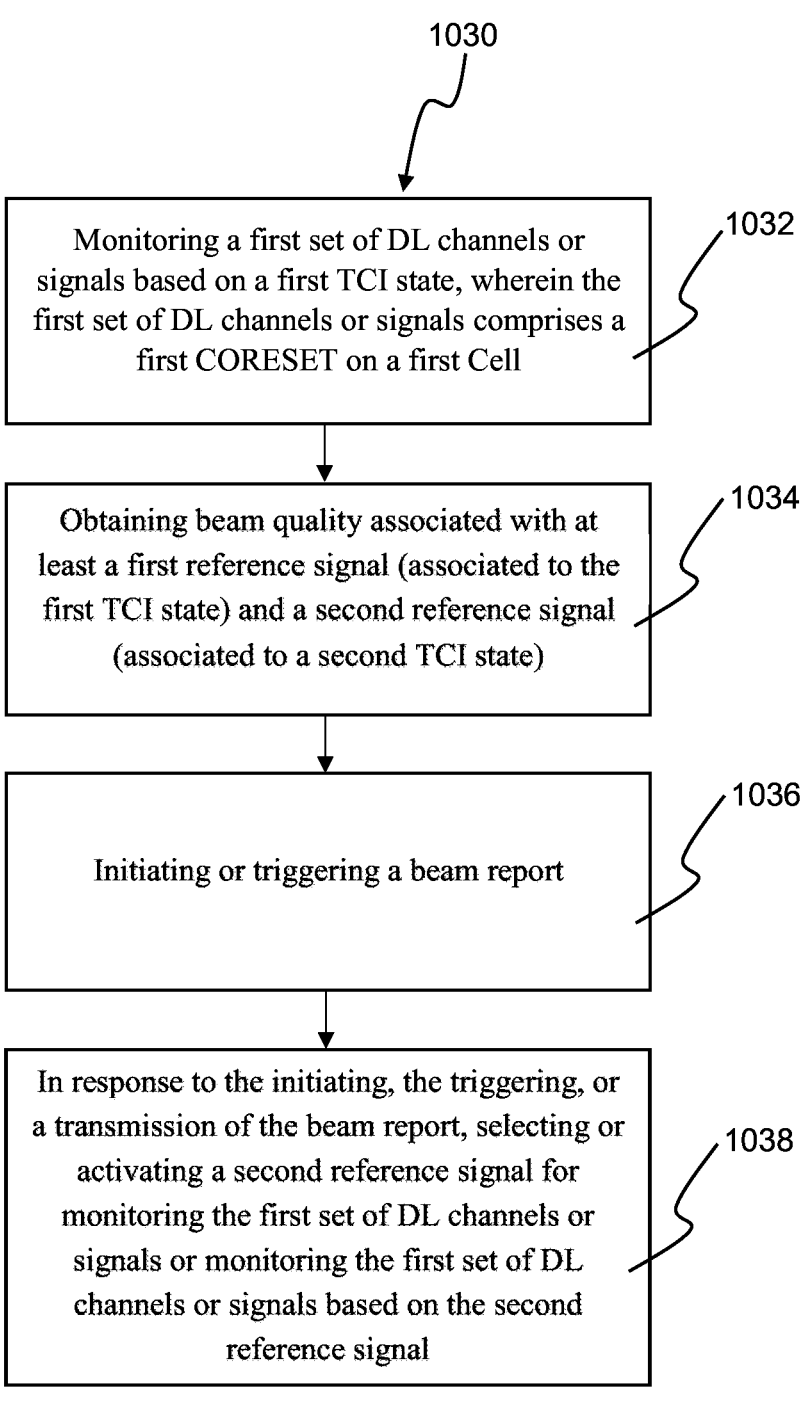

FIG. 21 is a flow diagram of a method of a UE comprising monitoring a first set of DL channel or signal based on a first TCI state, in accordance with embodiments of the present invention.

Figure 22:
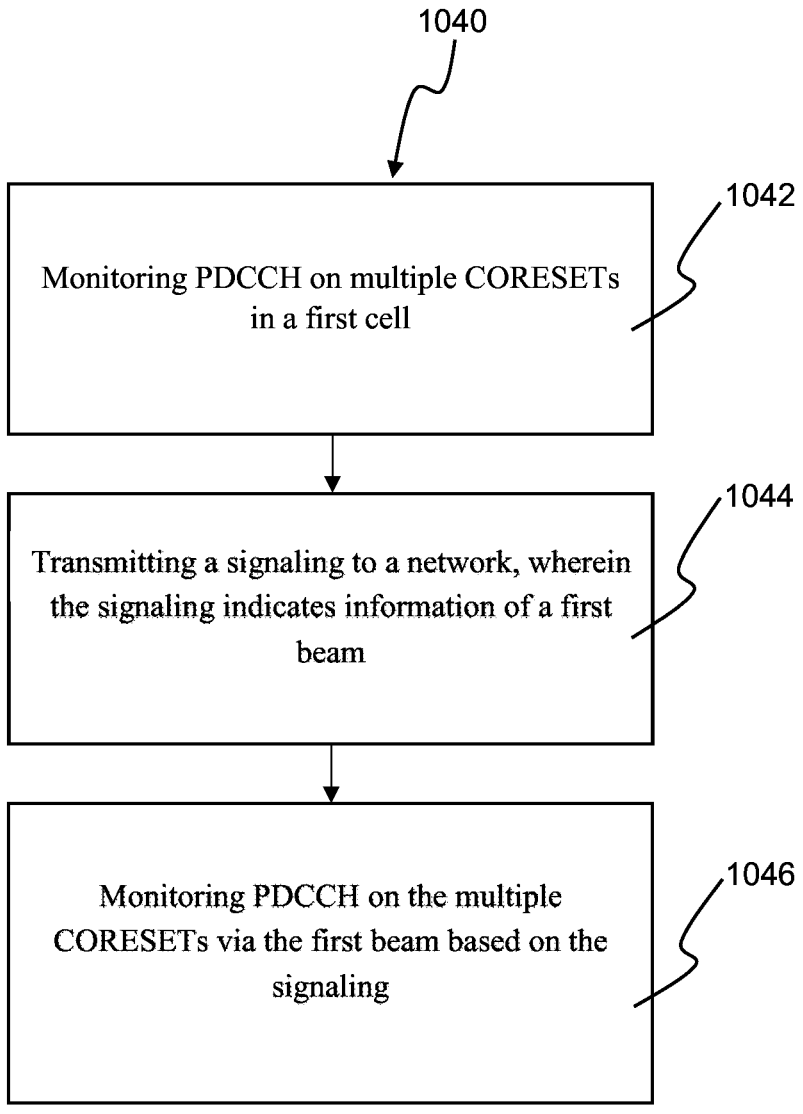

FIG. 22 is a flow diagram of a method of a UE comprising monitoring PDCCH on multiple CORESETs in a first cell, in accordance with embodiments of the present invention.

Figure 23:
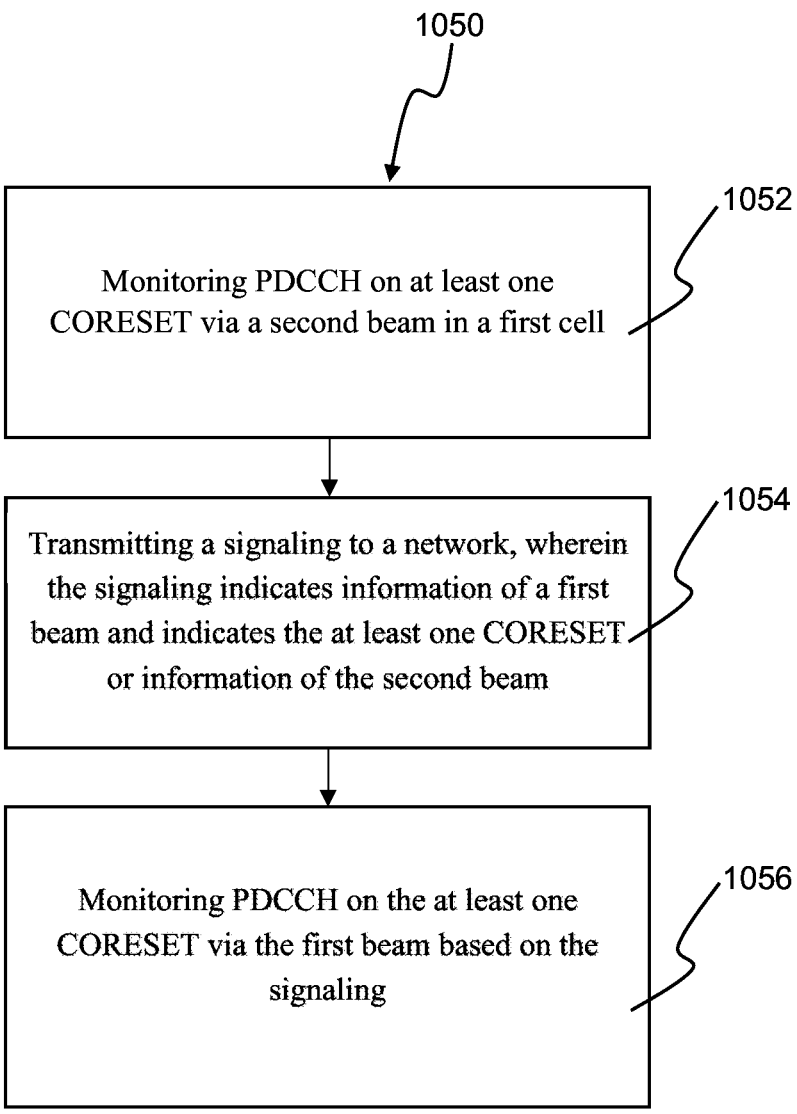

FIG. 23 is a flow diagram of a method of a UE comprising monitoring PDCCH on at least one CORESET via a second beam in a first cell, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-193133 New WID: Further enhancements on MIMO for NR; [2] 3GPP TS 38.214 v16.6.0; [3] 3GPP TS 38.331 v16.5.0; [4] 3GPP TS 38.321 v16.5.0; [5] 3GPP RAN1 #105-e chairman's Notes; and [6] 3GPP RAN1 #106-e chairman's Notes. The standards and documents listed above are hereby expressly and fully incorporated herein by reference in their entirety.

Figure 1:
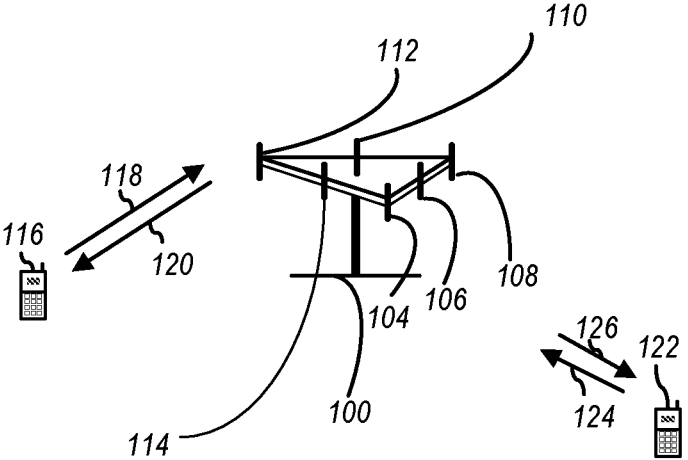
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
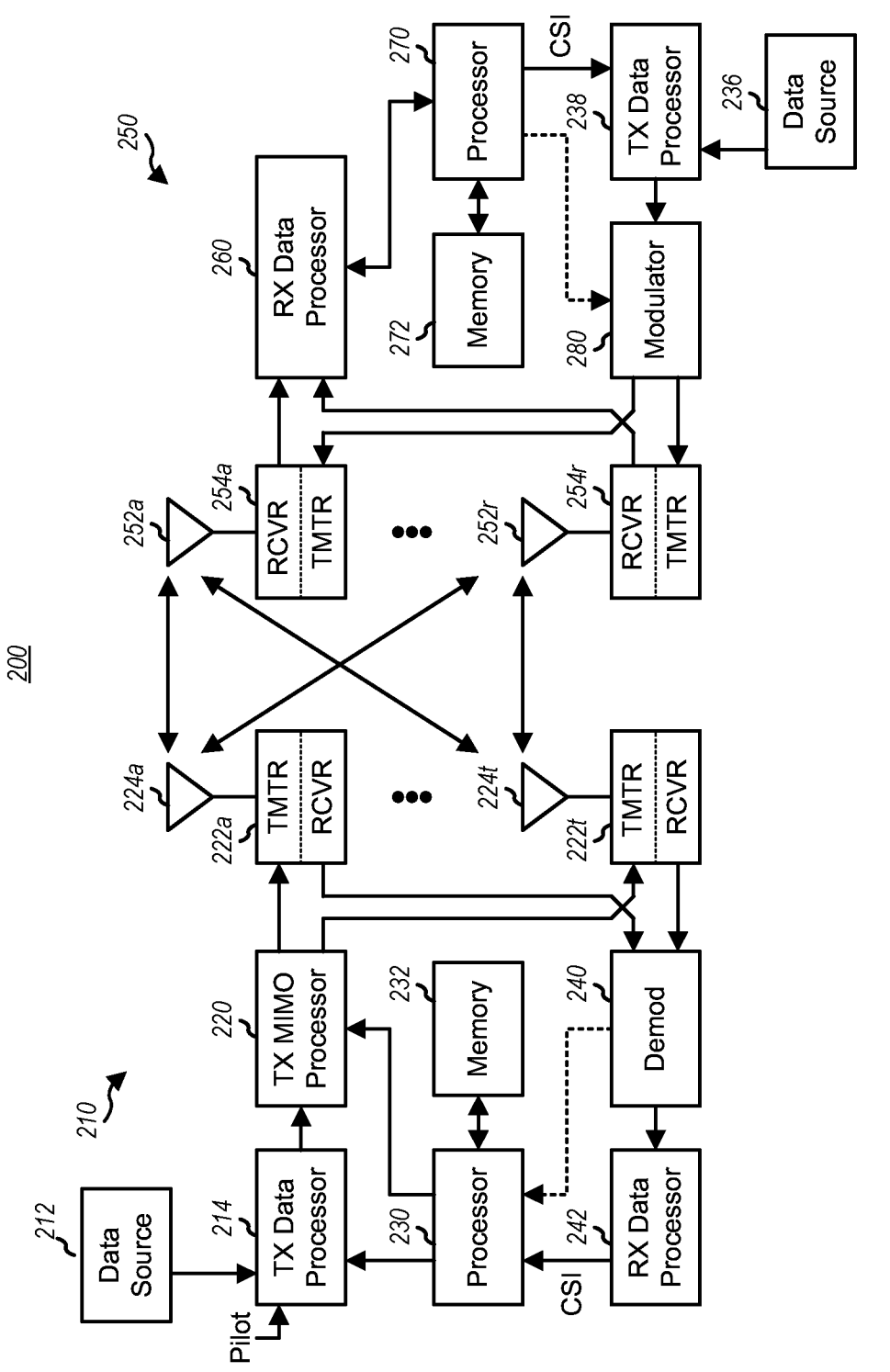
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
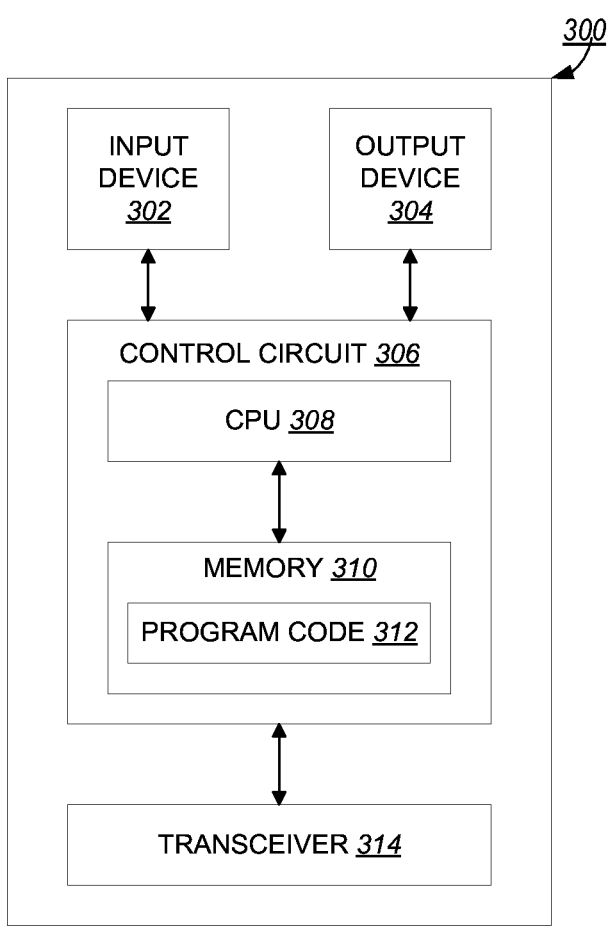
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
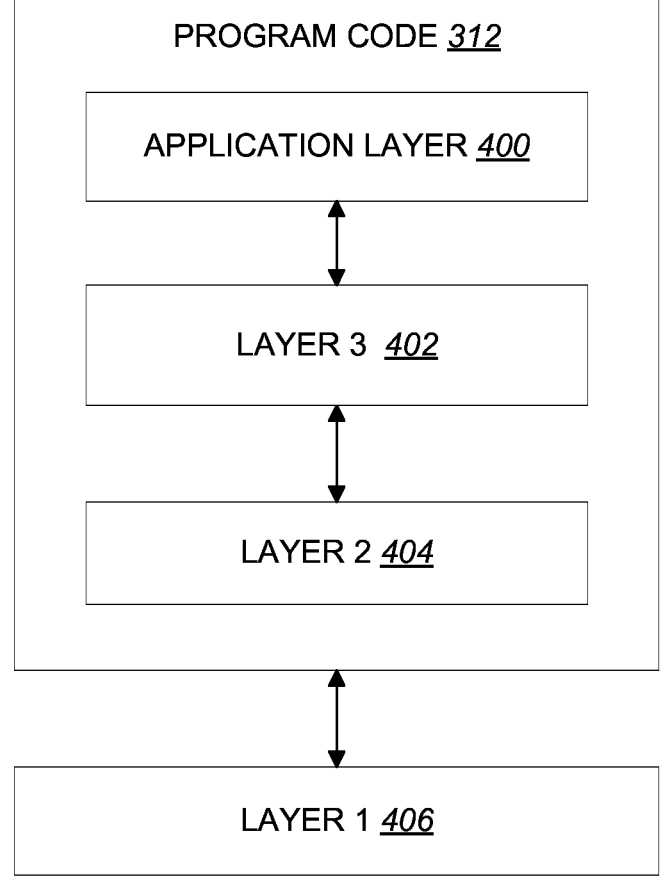
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In Work item description for Further enhancements on MIMO for NR ([1] RP-193133 New WID: Further enhancements on MIMO for NR), beam management considering multi-TRP/panel operation is considered as one of the objectives:

3 Justification

The Rel-15 NR includes a number of MIMO features that facilitate utilization of a large number of antenna elements at base station for both sub-6 GHz and over-6 GHz frequency bands. The Rel-16 NR enhances Rel-15 by introducing enhanced Type II codebook with DFT-based compression, support for multi-TRP transmission especially for eMBB and PDSCH, enhancements for multi-beam operation including reduction in latency and/or overhead for various reconfigurations (QCL-related, measurements), SCell beam failure recovery (BFR), and L1-SINR. In addition, low PAPR reference signals and features enabling uplink full-power transmission are also introduced.

As NR is in the process of commercialization, various aspects that require further enhancements can be identified from real deployment scenarios. Such aspects include the following. First, while Rel-16 manages to offer some reduction in overhead and/or latency, high-speed vehicular scenarios (e.g. a UE traveling at high speed on highways) at FR2 require more aggressive reduction in latency and overhead—not only for intra-cell, but also for L1/L2 centric inter-cell mobility. This also includes reducing the occurrence of beam failure events. Second, while enhancements for enabling panel-specific UL beam selection was investigated in Rel-16, there was not sufficient time to complete the work. This offers some potential for increasing UL coverage including, e.g. mitigating the UL coverage loss due to meeting the MPE (maximum permissible exposure) regulation. It is noted that MPE issue may occur on all transmit beams from the panel, therefore, a solution for MPE mitigation may only be performed per panel basis to meet the regulatory requirement for scenarios of interest.

Third, channels other than PDSCH can benefit from multi-TRP transmission (as well as multi-panel reception) which also includes multi-TRP for inter-cell operations. This includes some new use cases for multi-TRP such as UL dense deployment within a macro-cell and/or heterogeneous-network-type deployment scenarios. Fourth, due to the use of SRS for various scenarios, SRS can and should be further enhanced at least for capacity and coverage. Fifth, although Rel-16 supports enhanced Type II CSI, some room for further enhancements can be perceived. This includes CSI designed for multi-TRP/panel for NC-JT use case and the utilization of partial reciprocity on channel statistics such as angle(s) and delay(s) mainly targeting FR1 FDD deployments.

4 Objective 4.1 Objective of SI or Core Part WI or Testing Part WI

The work item aims to specify the further enhancements identified for NR MIMO. The detailed objectives are as follows:

Extend specification support in the following areas [RAN1]

1. Enhancement on multi-beam operation, mainly targeting FR2 while also applicable to FR1:
   a. Identify and specify features to facilitate more efficient (lower latency and overhead) DL/UL beam management to support higher intra- and L1/L2-centric inter-cell mobility and/or a larger number of configured TCI states:
      i. Common beam for data and control transmission/ reception for DL and UL, especially for intra-band CA ii. Unified TCI framework for DL and UL beam indication
      iii. Enhancement on signaling mechanisms for the above features to improve latency and efficiency with more usage of dynamic control signaling (as opposed to RRC)
   b. Identify and specify features to facilitate UL beam selection for UEs equipped with multiple panels, considering UL coverage loss mitigation due to MPE, based on UL beam indication with the unified TCI framework for UL fast panel selection 2. Enhancement on the support for multi-TRP deployment, targeting both FR1 and FR2:
   a. Identify and specify features to improve reliability and robustness for channels other than PDSCH (that is, PDCCH, PUSCH, and PUCCH) using multi-TRP and/or multi-panel, with Rel. 16 reliability features as the baseline
   b. Identify and specify QCL/TCI-related enhancements to enable inter-cell multi-TRP operations, assuming multi-DCI based multi-PDSCH reception In 3GPP specification 38.214 ([2] 3GPP TS 38.214 v16.6.0), beam reporting is introduced:

5.2 UE Procedure for Reporting Channel State Information (CSI)

5.2.1 Channel State Information Framework

The procedures on aperiodic CSI reporting described in this clause assume that the CSI reporting is triggered by DCI format 0_1, but they equally apply to CSI reporting triggered by DCI format 0_2, by applying the higher layer parameter reportTriggerSizeDCI-0-2 instead of reportTriggerSize.

The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP or L1-SINR.

For CQI, PMI, CRI, SSBRI, LI, RI, L1-RSRP, L1-SINR a UE is configured by higher layers with $N\geq1$ CSI-Report-Config Reporting Settings, $M\geq1$ CSI-ResourceConfig Resource Settings, and one or two list(s) of trigger states (given by the higher layer parameters CSI-AperiodicTriggerStateList and CSI-SemiPersistentOnPUSCH-Trigger-StateList). Each trigger state in CSI-AperiodicTriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig.

5.2.1.1 Reporting Settings

Each Reporting Setting CSI-ReportConfig is associated with a single downlink BWP (indicated by higher layer parameter BWP-Id) given in the associated CSI-ResourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as the layer indicator (LI), L1-RSRP, L1-SINR, CRI, and SSBRI (SSB Resource Indicator).

The time domain behavior of the CSI-ReportConfig is indicated by the higher layer parameter reportConfigType and can be set to 'aperiodic', 'semiPersistentOnPUCCH', 'semiPersistentOnPUSCH', or 'periodic'. For 'periodic' and 'semiPersistentOnPUCCH', 'semiPersistentOnPUSCH' CSI reporting, the configured periodicity and slot offset applies in the numerology of the UL BWP in which the CSI report is configured to be transmitted on. The higher layer parameter reportQuantity indicates the CSI-related, L1-RSRP-related or L1-SINR-related quantities to report. The reportFreqConfiguration indicates the reporting granularity in the frequency domain, including the CSI reporting band and if PMI/CQI reporting is wideband or sub-band. The timeRestrictionForChannelMeasurements parameter in CSI-ReportConfig can be configured to enable time domain restriction for channel measurements and timeRestriction-ForInterferenceMeasurements can be configured to enable time domain restriction for interference measurements. The CSI-ReportConfig can also contain CodebookConfig, which contains configuration parameters for Type-I, Type II or Enhanced Type II CSI including codebook subset restriction, and configurations of group-based reporting.

5.2.1.2 Resource Settings

Each CSI Resource Setting CSI-ResourceConfig contains a configuration of a list of S≥1 CSI Resource Sets (given by higher layer parameter csi-RS-ResourceSetList), where the list is comprised of references to either or both of NZP CSI-RS resource set(s) and SS/PBCH block set(s) or the list is comprised of references to CSI-IM resource set(s). Each CSI Resource Setting is located in the DL BWP identified by the higher layer parameter BWP-id, and all CSI Resource Settings linked to a CSI Report Setting have the same DL BWP.

the same CSI-IM resource ID, the same time-domain behavior shall be configured for the CSI-ResourceConfigs. All CSI Resource Settings linked to a CSI Report Setting shall have the same time domain behavior.

5.2.1.4 Reporting Configurations

The UE shall calculate CSI parameters (if reported) assuming the following dependencies between CSI parameters (if reported)

LI shall be calculated conditioned on the reported CQI, PMI, RI and CRI

CQI shall be calculated conditioned on the reported PMI, RI and CRI

PMI shall be calculated conditioned on the reported RI and CRI

RI shall be calculated conditioned on the reported CRI.

The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 shows the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in Clause 5.2.1.5.2. Aperiodic CSI-RS is configured and triggered/activated as described in Clause 5.2.1.5.1.

TABLE 5.2.1.4-1

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command, as described in clause 6.1.3.16 of [10, TS 38.321]; for reporting on PUSCH, the UE receives triggering on DCI | Triggered by DCI; additionally, subselection indication as described in clause 6.1.3.13 of [10, TS 38.321] possible as defined in Clause 5.2.1.5.1. |
| Semi-Persistent CSI-RS | Not Supported | For reporting on PUCCH, the UE receives an activation command, as described in clause 6.1.3.16 of [10, TS 38.321]; for reporting on PUSCH, the UE receives triggering on DCI | Triggered by DCI; additionally, subselection indication as described in clause 6.1.3.13 of [10, TS 38.321] possible as defined in Clause 5.2.1.5.1. |
| Aperiodic CSI-RS | Not Supported | Not Supported | Triggered by DCI; additionally, subselection indication as described in clause 6.1.3.13 of [10, TS 38.321] possible as defined in Clause 5.2.1.5.1. |

The time domain behavior of the CSI-RS resources within a CSI Resource Setting are indicated by the higher layer parameter resourceType and can be set to aperiodic, periodic, or semi-persistent. For periodic and semi-persistent CSI Resource Settings, the number of CSI-RS Resource Sets configured is limited to S=1. For periodic and semi-persistent CSI Resource Settings, the configured periodicity and slot offset is given in the numerology of its associated DL BWP, as given by BWP-id. When a UE is configured with multiple CSI-ResourceConfigs consisting the same NZP CSI-RS resource ID, the same time domain behavior shall be configured for the CSI-ResourceConfigs. When a UE is configured with multiple CSI-ResourceConfigs consisting 5.2.1.4.1 Resource Setting Configuration For aperiodic CSI, each trigger state configured using the higher layer parameter CSI-AperiodicTriggerState is associated with one or multiple CSI-ReportConfig where each CSI-ReportConfig is linked to periodic, or semi-persistent, or aperiodic resource setting(s):

When one Resource Setting is configured, the Resource Setting (given by higher layer parameter resources-ForChannelMeasurement) is for channel measurement for L1-RSRP or for channel and interference measurement for L1-SINR computation.

When two Resource Settings are configured, the first one Resource Setting (given by higher layer parameter resourcesForChannelMeasurement) is for channel measurement and the second one (given by either higher layer parameter csi-IM-ResourcesForInterference or higher layer parameter nzp-CSI-RS-Resources-ForInterference) is for interference measurement performed on CSI-IM or on NZP CSI-RS.

When three Resource Settings are configured, the first Resource Setting (higher layer parameter resourcesForChannelMeasurement) is for channel measurement, the second one (given by higher layer parameter csi-IM-ResourcesForInterference) is for CSI-IM based interference measurement and the third one (given by higher layer parameter nzp-CSI-RS-ResourcesForInterference) is for NZP CSI-RS based interference measurement.

For semi-persistent or periodic CSI, each CSI-ReportConfig is linked to periodic or semi-persistent Resource Setting (s):

When one Resource Setting (given by higher layer parameter resourcesForChannelMeasurement) is configured, the Resource Setting is for channel measurement for L1-RSRP or for channel and interference measurement for L1-SINR computation.

When two Resource Settings are configured, the first Resource Setting (given by higher layer parameter resourcesForChannelMeasurement) is for channel measurement and the second Resource Setting (given by higher layer parameter csi-IM-ResourcesForInterference) is used for interference measurement performed on CSI-IM.

For L1-SINR computation, the second Resource Setting (given by higher layer parameter csi-IM-ResourcesForinterference or higher layer parameter nzp-CSI-RS-ResourceForInterference) is used for interference measurement performed on CSI-IM or on NZP CSI-RS.

5.2.1.4.2 Report Quantity Configurations

A UE may be configured with a CSI-ReportConfig with the higher layer parameter reportQuantity set to either 'none', 'cri-RI-PMI-CQI', 'cri-RI-i1', 'cri-RI-i1-CQI', 'cri-RI-CQI', 'cri-RSRP', 'cri-SINR', 'ssb-Index-RSRP', 'ssb-Index-SINR' or 'cri-RI-LI-PMI-CQI'.

If the UE is configured with a CSI-ReportConfig with the higher layer parameter reportQuantity set to 'none', then the UE shall not report any quantity for the CSI-ReportConfig.

If the UE is configured with a CSI-ReportConfig with the higher layer parameter reportQuantity set to 'cri-RI-PMI-CQI', or 'cri-RI-LI-PMI-CQI', the UE shall report a preferred precoder matrix for the entire reporting band, or a preferred precoder matrix per subband, according to Clause 5.2.2.2.

If the UE is configured with a CSI-ReportConfig with the higher layer parameter reportQuantity set to 'cri-RSRP' or 'ssb-Index-RSRP', if the UE is configured with the higher layer parameter groupBasedBeamReporting set to 'disabled', the UE is not required to update measurements for more than 64 CSI-RS and/or SSB resources, and the UE shall report in a single report nrofReportedRS (higher layer configured) different CRI or SSBRI for each report setting.

if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.

If the UE is configured with a CSI-ReportConfig with the higher layer parameter reportQuantity set to 'cri-SINR' or 'ssb-Index-SINR', if the UE is configured with the higher layer parameter groupBasedBeamReporting set to 'disabled', the UE shall report in a single report nrofReportedRS (higher layer configured) different CRI or SSBRI for each report setting.

if the UE is configured with the higher layer parameter groupBasedBeamReporting set to 'enabled', the UE shall report in a single reporting instance two different CRI or SSBRI for each report setting, where CSI-RS and/or SSB resources can be received simultaneously by the UE.

If the UE is configured with a CSI-ReportConfig with the higher layer parameter reportQuantity set to 'cri-RSRP', 'cri-RI-PMI-CQI', 'cri-RI-i1', 'cri-RI-i1-CQI', 'cri-RI-CQI', 'cri-RI-LI-PMI-CQI', or 'cri-SINR', and $K_s > 1$ resources are configured in the corresponding resource set for channel measurement, then the UE shall derive the CSI parameters other than CRI conditioned on the reported CRI, where CRI k ($k \geq 0$) corresponds to the configured (k+1)-th entry of associated nzp-CSI-RS-Resources in the corresponding NZP-CSI-RS-ResourceSet for channel measurement, and (k+1)-th entry of associated csi-IM-Resource in the corresponding csi-IM-ResourceSet (if configured) or (k+1)-th entry of associated nzp-CSI-RS-Resources in the corresponding NZP-CSI-RS-ResourceSet (if configured for CSI-ReportConfig with reportQuantity set to 'cri-SINR') for interference measurement. If $K_s = 2$ CSI-RS resources are configured, each resource shall contain at most 16 CSI-RS ports. If $2 < K_s \leq 8$ CSI-RS resources are configured, each resource shall contain at most 8 CSI-RS ports.

If the UE is configured with a CSI-ReportConfig with the higher layer parameter reportQuantity set to 'ssb-Index-RSRP', the UE shall report SSBRI, where SSBRI k ($k \geq 0$) corresponds to the configured (k+1)-th entry of the associated csi-SSB-ResourceList in the corresponding CSI-SSB-ResourceSet.

If the UE is configured with a CSI-ReportConfig with the higher layer parameter reportQuantity set to 'ssb-Index-SINR', the UE shall derive L1-SINR conditioned on the reported SSBRI, where SSBRI k ($k \geq 0$) corresponds to the configured (k+1)-th entry of the associated csi-SSB-ResourceList in the corresponding CSI-SSB-ResourceSet for channel measurement, and (k+1)-th entry of associated csi-IM-Resource in the corresponding csi-IM-ResourceSet (if configured) or (k+1)-th entry of associated nzp-CSI-RS-Resources in the corresponding NZP-CSI-RS-ResourceSet (if configured) for interference measurement.

5.2.1.4.3 L1-RSRP Reporting

For L1-RSRP computation the UE may be configured with CSI-RS resources, SS/PBCH Block resources or both CSI-RS and SS/PBCH block resources, when resource-wise quasi co-located with 'type C' and 'typeD' when applicable.

the UE may be configured with CSI-RS resource setting up to 16 CSI-RS resource sets having up to 64 resources within each set. The total number of different CSI-RS resources over all resource sets is no more than 128.

For L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBased-BeamReporting is configured as 'enabled', the UE shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 38.133].

If the higher layer parameter timeRestrictionForChannelMeasurements in CSI-ReportConfig is set to "notConfigured", the UE shall derive the channel measurements for computing L1-RSRP value reported in uplink slot n based on only the SS/PBCH or NZP CSI-RS, no later than the CSI reference resource, (defined in TS 38.211[4]) associated with the CSI resource setting.

If the higher layer parameter timeRestrictionForChannelMeasurements in CSI-ReportConfig is set to "Configured", the UE shall derive the channel measurements for computing L1-RSRP reported in uplink slot n based on only the most recent, no later than the CSI reference resource, occasion of SS/PBCH or NZP CSI-RS (defined in [4, TS 38.211]) associated with the CSI resource setting.

5.2.1.4.4 L1-SINR Reporting

For L1-SINR computation, for channel measurement the UE may be configured with NZP CSI-RS resources and/or SS/PBCH Block resources, for interference measurement the UE may be configured with NZP CSI-RS or CSI-IM resources.

for channel measurement, the UE may be configured with CSI-RS resource setting with up to 16 resource sets, with a total of up to 64 CSI-RS resources or up to 64 SS/PBCH Block resources.

For L1-SINR reporting, if the higher layer parameter nrofReportedRS in CSI-ReportConfig is configured to be one, the reported L1-SINR value is defined by a 7-bit value in the range [−23,40] dB with 0.5 dB step size, and if the higher layer parameter nrofReportedRS is configured to be larger than one, or if the higher layer parameter groupBased-BeamReporting is configured as 'enabled', the UE shall use differential L1-SINR based reporting, where the largest measured value of L1-SINR is quantized to a 7-bit value in the range [−23, 40] dB with 0.5 dB step size, and the differential L1-SINR is quantized to a 4-bit value. The differential L1-SINR is computed with 1 dB step size with a reference to the largest measured L1-SINR value which is part of the same L1-SINR reporting instance. When NZP CSI-RS is configured for channel measurement and/or interference measurement, the reported L1-SINR values should not be compensated by the power offset(s) given by higher layer parameter powerControOffsetSS or powerControlOffset.

When one or two resource settings are configured for L1-SINR measurement

If the higher layer parameter timeRestrictionForChannelMeasurements in CSI-ReportConfig is set to 'notConfigured', the UE shall derive the channel measurements for computing L1-SINR reported in uplink slot n based on only the SSB or NZP CSI-RS, no later than the CSI reference resource, (defined in TS 38.211[4]) associated with the CSI resource setting.

If the higher layer parameter timeRestrictionForChannelMeasurements in CSI-ReportConfig is set to 'configured', the UE shall derive the channel measurements for computing L1-SINR reported in uplink slot n based on only the most recent, no later than the CSI reference resource, occasion of SSB or NZP CSI-RS (defined in [4, TS 38.211]) associated with the CSI resource setting.

If the higher layer parameter timeRestrictionForInterferenceMeasurements in CSI-ReportConfig is set to 'notConfigured', the UE shall derive the interference measurements for computing L1-SINR reported in uplink slot n based on only the CSI-IM or NZP CSI-RS for interference measurement (defined in [4, TS 38.211]) or NZP CSI-RS for channel and interference measurement no later than the CSI reference resource associated with the CSI resource setting.

If the higher layer parameter timeRestrictionForInterferenceMeasurements in CSI-ReportConfig is set to 'configured', the UE shall derive the interference measurements for computing the L1-SINR reported in uplink slot n based on the most recent, no later than the CSI reference resource, occasion of CSI-IM or NZP CSI-RS for interference measurement (defined in [4, TS 38.211]) or NZP CSI-RS for channel and interference measurement associated with the CSI resource setting.

In TS 38.331 ([3] 3GPP TS 38.331 v16.5.0), radio link measurement, beam measurement, and channel, beam reporting configuration is introduced:

5.5.3 Performing Measurements 5.5.3.1 General

An RRC_CONNECTED UE shall derive cell measurement results by measuring one or multiple beams associated per cell as configured by the network, as described in 5.5.3.3. For all cell measurement results, except for RSSI, and CLI measurement results in RRC_CONNECTED, the UE applies the layer 3 filtering as specified in 5.5.3.2, before using the measured results for evaluation of reporting criteria, measurement reporting or the criteria to trigger conditional reconfiguration execution. For cell measurements, the network can configure RSRP, RSRQ, SINR, RSCP or EcN0 as trigger quantity. For CLI measurements, the network can configure SRS-RSRP or CLI-RSSI as trigger quantity. For cell and beam measurements, reporting quantities can be any combination of quantities (i.e. only RSRP; only RSRQ; only SINR; RSRP and RSRQ; RSRP and SINR; RSRQ and SINR; RSRP, RSRQ and SINR; only RSCP; only EcN0; RSCP and EcN0), irrespective of the trigger quantity, and for CLI measurements, reporting quantities can be either SRS-RSRP or CLI-RSSI. For conditional reconfiguration execution, the network can configure up to 2 quantities, both using same RS type. The UE does not apply the layer 3 filtering as specified in 5.5.3.2 to derive the CBR measurements.

The network may also configure the UE to report measurement information per beam (which can either be measurement results per beam with respective beam identifier(s) or only beam identifier(s)), derived as described in 5.5.3.3a. If beam measurement information is configured to be included in measurement reports, the UE applies the layer 3 beam filtering as specified in 5.5.3.2. On the other hand, the exact L1 filtering of beam measurements used to derive cell measurement results is implementation dependent.

5.5.3.3a Derivation of Layer 3 Beam Filtered Measurement

The UE shall:

1> for each layer 3 beam filtered measurement quantity to be derived based on SS/PBCH block;

2> derive each configured beam measurement quantity based on SS/PBCH block as described in TS 38.215 [9], and apply layer 3 beam filtering as described in 5.5.3.2;

1> for each layer 3 beam filtered measurement quantity to be derived based on CSI-RS;

2> derive each configured beam measurement quantity based on CSI-RS as described in TS 38.215 [9], and apply layer 3 beam filtering as described in 5.5.3.2.

ControlResourceSet

The IE ControlResourceSet is used to configure a time/frequency control resource set (CORESET) in which to search for downlink control information (see TS 38.213 [13], clause 10.1).

```
ControlResourceSet ::=          SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex                      INTEGER(0..maxNrofPhysicalResourceBlocks-1)
OPTIONAL -- Need S
        },
        nonInterleaved                  NULL
    },
    precoderGranularity             ENUMERATED {sameAsREG-bundle, allContiguousRBs},
    tci-StatesPDCCH-ToAddList       SEQUENCE(SIZE (1..maxNrofTCI-StatesPDCCH)) OF TCI-StateId
OPTIONAL, -- Cond NotSIB1-initialBWP
    tci-StatesPDCCH-ToReleaseList   SEQUENCE(SIZE (1..maxNrofTCI-StatesPDCCH)) OF TCI-StateId
OPTIONAL, -- Cond NotSIB1-initialBWP
    tci-PresentInDCI                ENUMERATED {enabled}
OPTIONAL, -- Need S
    pdcch-DMRS-ScramblingID         INTEGER (0..65535)
OPTIONAL, -- Need S
    ...,
    [[
    rb-Offset-r16                   INTEGER (0..5)
OPTIONAL, -- Need S
    tci-PresentDCI-1-2-r16          INTEGER (1..3)
OPTIONAL, -- Need S
    coresetPoolIndex-r16            INTEGER (0..1)
OPTIONAL, -- Need S
    controlResourceSetId-v1610      ControlResourceSetId-v1610
OPTIONAL  -- Need S
    ]]
}
```

---

ControlResourceSet field descriptions controlResourceSetId
Identifies the instance of the ControlResourceSet IE. Value 0 identifies the common CORESET configured in MIB and in ServingCellConfigCommon (controlResourceSetZero) and is hence not used here in the ControlResourceSet IE. Other values identify CORESETs configured by dedicated signalling or in SIB1. The controlResourceSetId is unique among the BWPs of a serving cell.
If the field controlResourceSetId-v1610 is present, the UE shall ignore the controlResourceSetId field (without suffix).
coresetPoolIndex
The index of the CORESET pool for this CORESET as specified in TS 38.213 [13] (clauses 9 and 10) and TS 38.214 [19] (clauses 5.1 and 6.1). If the field is absent, the UE applies the value 0.
duration
Contiguous time duration of the CORESET in number of symbols (see TS 38.211 [16], clause 7.3.2.2).
frequencyDomainResources
Frequency domain resources for the CORESET. Each bit corresponds a group of 6 RBs, with grouping starting from the first RB group in the BWP. When at least one search space is configured with freqMonitorLocation-r16, only the first $N_{RBG,\ set0}^{size}$ bits are valid (see TS 38.213 [13], clause 10.1). The first (left-most/most significant) bit corresponds to the first RB group in the BWP, and so on. A bit that is set to 1 indicates that this RB group belongs to the frequency domain resource of this CORESET. Bits corresponding to a group of RBs not fully contained in the bandwidth part within which the CORESET is configured are set to zero (see TS 38.211 [16], clause 7.3.2.2).
tci-StatesPDCCH-ToAddList
A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports (see TS 38.213 [13], clause 6.). The network configures at most maxNrofTCI-StatesPDCCH entries.

ControlResourceSetId

The ControlResourceSetId IE concerns a short identity, used to identify a control resource set within a serving cell. The ControlResourceSetId=0 identifies the ControlResourceSet #0 configured via PBCH (MID) and in controlResourceSetZero (ServingCellConfigCommon). The ID space is used across the BWPs of a Serving Cell.

ControlResourceSetZero

The IE ControlResourceSetZero is used to configure CORESET #0 of the initial BWP (see TS 38.213 [13], clause 13).

PDCCH-Config

The IE PDCCH-Config is used to configure UE specific PDCCH parameters such as control resource sets (CORESET), search spaces and additional parameters for acquiring the PDCCH. If this IE is used for the scheduled cell in case of cross carrier scheduling, the fields other than searchSpacesToAddModList and searchSpacesToReleaseList are absent. If the IE is used for a dormant BWP, the fields other than controlResourceSetToAddModList and controiResourceSetToReleaseList are absent.

```
PDCCH-Config ::=            SEQUENCE {
    controlResourceSetToAddModList    SEQUENCE(SIZE (1..3)) OF
                                      ControlResourceSet
OPTIONAL,   -- Need N
    controlResourceSetToReleaseList   SEQUENCE(SIZE (1..3)) OF
                                      ControlResourceSetId
OPTIONAL,   -- Need N
    searchSpacesToAddModList          SEQUENCE(SIZE (1..10)) OF
                                      SearchSpace
OPTIONAL,   -- Need N
    searchSpacesToReleaseList         SEQUENCE(SIZE (1..10)) OF
                                      SearchSpaceId
OPTIONAL,   -- Need N
```

---

PDCCH-Config field descriptions controlResourceSetToAddModList, controlResourceSetToAddModListSizeExt
List of UE specifically configured Control Resource Sets (CORESETs) to be used by the UE. The network restrictions on configuration of CORESETs per DL BWP are specified in TS 38.213 [13], clause 10.1 and TS 38.306 [26]. The UE shall consider entries in controlResourceSetToAddModList and in controlResourceSetToAddModListSizeExt as a single list, i.e. an entry created using controlResourceSetToAddModList can be modifed using controlResourceSetToAddModListSizeExt (or deleted using controlResourceSetToReleaseListSizeExt) and vice-versa. In case network reconfigures control resource set with the same ControlResourceSetId as used for commonControlResourceSet configured via PDCCH-ConfigCommon, the configuration from PDCCH-Config always takes precedence and should not be updated by the UE based on servingCellConfigCommon.
searchSpacesToAddModList, searchSpacesToAddModListExt
List of UE specifically configured Search Spaces. The network configures at most 10 Search Spaces per BWP per cell (including UE-specific and common Search Spaces). If the network includes searchSpaceToAddModListExt, it includes the same number of entries, and listed in the same order, as in searchSpacesToAddModList.

---

PDCCH-ConfigCommon

The IE PDCCH-ConfigCommon is used to configure cell specific PDCCH parameters provided in SIB as well as in dedicated signalling.

```
PDCCH-ConfigCommon ::=          SEQUENCE {
    controlResourceSetZero          ControlResourceSetZero
OPTIONAL,   -- Cond InitialBWP-Only
    commonControlResourceSet        ControlResourceSet
OPTIONAL,   -- Need R
    searchSpaceZero                 SearchSpaceZero
OPTIONAL,   -- Cond InitialBWP-Only
    commonSearchSpaceList           SEQUENCE (SIZE(1..4))
                                    OF SearchSpace
OPTIONAL,   -- Need R
    searchSpaceSIB1                 SearchSpaceId
```

-continued

```
OPTIONAL,   -- Need S
    searchSpaceOtherSystemInformation     SearchSpaceId
OPTIONAL,   -- Need S
    pagingSearchSpace                     SearchSpaceId
OPTIONAL,   -- Need S
    ra-SearchSpace                        SearchSpaceId
OPTIONAL,   -- Need S
    ...,
}
```

---

PDCCH-ConfigCommon field descriptions commonControlResourceSet
An additional common control resource set which may be configured and used for any common or UE-specific search space. If the network configures this field, it uses a ControlResourceSetId other than 0 for this ControlResourceSet. The network configures the commonControlResourceSet in SIB1 so that it is contained in the bandwidth of CORESET#0.

---

PDCCH-ConfigSIB1

The IE PDCCH-ConfigSIB1 is used to configure CORESET #0 and search space #0.

```
PDCCH-ConfigSIB1 ::=          SEQUENCE {
    controlResourceSetZero        ControlResourceSetZero,
    searchSpaceZero               SearchSpaceZero
}
```

---

PDCCH-ConfigSIB1 field descriptions controlResourceSetZero
Determines a common ControlResourceSet (CORESET) with ID #0, see TS 38.213 [13], clause 13.

---

CSI-ReportConfig

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

```
CSI-ReportConfig ::=              SEQUENCE {
  reportConfigId                       CSI-ReportConfigId,
  carrier                              ServCellIndex            OPTIONAL,   -- Need S
  resourcesForChannelMeasurement       CSI-ResourceConfigId,
  csi-IM-ResourcesForInterference      CSI-ResourceConfigId     OPTIONAL,   -- Need R
  nzp-CSI-RS-ResourcesForInterference  CSI-ResourceConfigId     OPTIONAL,   -- Need R
  reportConfigType                     CHOICE {
    periodic                             SEQUENCE {
                reportSlotConfig           CSI-ReportPeriodicityAndOffset,
                pucch-CSI-ResourceList     SEQUENCE (SIZE (1..maxNrofBWPs)) OF PUCCH-CSI-
Resource
    },
    semiPersistentOnPUCCH                SEQUENCE {
                reportSlotConfig           CSI-ReportPeriodicityAndOffset,
                pucch-CSI-ResourceList     SEQUENCE (SIZE (1..maxNrofBWPs)) OF PUCCH-CSI-
Resource
    },
    semiPersistentOnPUSCH                SEQUENCE {
                reportSlotConfig           ENUMERATED (sl5, sl10, sl20, sl40, sl80, sl160,
sl320},
                reportSlotOffsetList       SEQUENCE (SIZE (1.. maxNrofUL-Allocations)) OF
INTEGER(0..32),
                p0alpha                    P0-PUSCH-AlphaSetId
    },
    aperiodic                            SEQUENCE {
                reportSlotOffsetList       SEQUENCE (SIZE (1..maxNrofUL-Allocations)) OF
INTEGER(0..32)
    }
  },
  reportQuantity                       CHOICE {
    none                                 NULL,
    cri-RI-PMI-CQI                       NULL,
    cri-RI-i1                            NULL,
    cri-RI-i1-CQI                        SEQUENCE {
                pdsch-BundleSizeForCSI     ENUMERATED (n2, n4}
OPTIONAL        -- Need S
    },
    cri-RI-CQI                           NULL,
    cri-RSRP                             NULL,
    ssb-Index-RSRP                       NULL,
    cri-RI-LI-PMI-CQI                    NULL
  },
  }
OPTIONAL,          -- Need R
  groupBasedBeamReporting              CHOICE {
    enabled                              NULL,
    disabled                             SEQUENCE {
                nrofReportedRS             ENUMERATED (n1, n2, n3, n4}
OPTIONAL        -- Need S
    }
  },
  reportQuantity-r16           CHOICE {
    cri-SINR-r16                         NULL,
    ssb-Index-SINR-r16                   NULL
  }
OPTIONAL,          -- Need R
```

| CSI-ReportConfig field descriptions |
|---|
| groupBasedBeamReporting |
| Turning on/off group beam based reporting (see TS 38.214 [19], clause 5.2.1.4). |
| reportConfigType |
| Time domain behavior of reporting configuration. |
| reportQuantity |

| CSI-ReportConfig field descriptions |
|---|
| The CSI related quantities to report. see TS 38.214 [19], clause 5.2.1. If the field reportQuantity-r16 is present, UE shall ignore reportQuantity (without suffix). |

-continued

CSI-ResourceConfig

The IE CSI-ResourceConfig defines a group of one or more NZP-CSI-RS-ResourceSet, CSI-IM-ResourceSet and/or CSI-SSB-ResourceSet.

```
CSI-ResourceConfig ::=       SEQUENCE {
   csi-ResourceConfigId          CSI-ResourceConfigId,
   csi-RS-ResourceSetList        CHOICE {
     nzp-CSI-RS-SSB                SEQUENCE {
       nzp-CSI-RS-ResourceSetList     SEQUENCE (SIZE (1..maxNrofNZP-CSI-RS-ResourceSetsPerConfig))
OF NZP-CSI-RS-ResourceSetId
```

-continued

```
OPTIONAL, -- Need R
     csi-SSB-ResourceSetList            SEQUENCE (SIZE (1..maxNrofCSI-SSB-ResourceSetsPerConfig)) OF
CSI-SSB-ResourceSetId   OPTIONAL     -- Need R
     },
     csi-IM-ResourceSetList            SEQUENCE (SIZE (1..maxNrofCSI-IM-ResourceSetsPerConfig)) OF CSI-
IM-ResourceSetId
   },
   bwp-Id                              BWP-Id,
   resourceType                        ENUMERATED { aperiodic, semiPersistent, periodic },
   ...
}
```

---

CSI-ResourceConfig field descriptions bwp-Id
The DL BWP which the CSI-RS associated with this CSI-ResourceConfig are located in (see TS 38.214 [19], clause 5.2.1.2.
csi-IM-ResourceSetList
List of references to CSI-IM resources used for CSI measurement and reporting in a CSI-RS resource set. Contains up to maxNrofCSI-IM-ResourceSetsPerConfig resource sets if resourceType is 'aperiodic' and 1 otherwise (see TS 38.214 [19], clause 5.2.1.2).
csi-ResourceConfigId
Used in CSI-ReportConfig to refer to an instance of CSI-ResourceConfig.
csi-SSB-ResourceSetList
List of references to SSB resources used for CSI measurement and reporting in a CSI-RS resource set (see TS 38.214 [19], clause 5.2.1.2).
nzp-CSI-RS-ResourceSetList
List of references to NZP CSI-RS resources used for beam measurement and reporting in a CSI-RS resource set. Contains up to maxNrofNZP-CSI-RS-ResourceSetsPerConfig resource sets if resourceType is 'aperiodic' and 1 otherwise (see TS 38.214 [19], clause 5.2.1.2).
resourceType
Time domain behavior of resource configuration (see TS 38.214 [19], clause 5.2.1.2). It does not apply to resources provided in the csi-SSB-ResourceSetList.

---

In 3GPP specification 38.321 ([4] 3GPP TS 38.321 v16.5.0), TO state activation/deactivation MAC CE for PDCCH and PDSCH, and PUCCH spatial relation activation/deactivation MAC CE is introduced:

5.18 Handling of MAC CEs 5.18.4 Activation/Deactivation of UE-Specific PDSCH TCI State The network may activate and deactivate the configured TCI states for PDSCH of a Serving Cell or a set of Serving Cells configured in simultaneousTCI-UpdateList1 or simultaneousTCI-UpdateList2 by sending the TCI States Activation/Deactivation for UE-specific PDSCH MAC CE described in clause 6.1.3.14. The network may activate and deactivate the configured TCI states for a codepoint of the DCI Transmission configuration indication field as specified in TS 38.212 [9] for PDSCH of a Serving Cell by sending the Enhanced TCI States Activation/Deactivation for UE-specific PDSCH MAC CE described in clause 6.1.3.24. The configured TCI states for PDSCH are initially deactivated upon configuration and after a handover.

The MAC entity shall:

1> if the MAC entity receives a TCI States Activation/Deactivation for UE-specific PDSCH MAC CE on a Serving Cell:

2> indicate to lower layers the information regarding the TCI States Activation/Deactivation for UE-specific PDSCH MAC CE.

1> if the MAC entity receives an Enhanced TCI States Activation/Deactivation for UE-specific PDSCH MAC CE on a Serving Cell:

2> indicate to lower layers the information regarding the Enhanced TCI States Activation/Deactivation for UE-specific PDSCH MAC CE.

5.18.5 Indication of TCI State for UE-Specific PDCCH

The network may indicate a TCI state for PDCCH reception for a CORESET of a Serving Cell or a set of Serving Cells configured in simultaneousTCI-Updatelist1 or simultaneousTCI-UpdateList2 by sending the TCI State Indication for UE-specific PDCCH MAC CE described in clause 6.1.3.15.

The MAC entity shall:

1> if the MAC entity receives a TCI State Indication for UE-specific PDCCH MAC CE on a Serving Cell:

2> indicate to lower layers the information regarding the TCI State Indication for UE-specific PDCCH MAC CE.

6.1.3 MAC Control Elements (CEs)

6.1.3.14 TO States Activation/Deactivation for UE-Specific PDSCH MAC CE

The TCI States Activation/Deactivation for UE-specific PDSCH MAC CE is identified by a MAC subheader with LCID as specified in Table 6.2.1-1. It has a variable size consisting of following fields:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-Updatelist1 or simultaneousTCI-UpdateList2, respectively;

BWP ID: This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells;

$T_i$: If there is a TCI state with TCI-StateId i as specified in TS 38.331 [5], this field indicates the activation/deactivation status of the TCI state with TCI-StateId i, otherwise MAC entity shall ignore the $T_i$ field. The $T_i$ field is set to 1 to indicate that the TCI state with TCI-StateId i shall be activated and mapped to the codepoint of the DCI Transmission Configuration Indication field, as specified in TS 38.214 [7]. The $T_i$ field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with $T_i$ field set to 1, i.e. the first TCI State with $T_i$ field set to 1 shall be mapped to the codepoint value 0, second TCI State with $T_i$ field set to 1 shall be mapped to the codepoint value 1 and so on. The maximum number of activated TCI states is 8;

CORESET Pool ID: This field indicates that mapping between the activated TCI states and the codepoint of the DCI Transmission Configuration Indication set by field $T_i$ is specific to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET. MAC entity shall ignore the CORESET Pool ID field in this MAC CE when receiving the MAC CE. If the Serving Cell in the MAC CE is configured in a cell list that contains more than one Serving Cell, the CORSET Pool ID field shall be ignored when receiving the MAC CE.

Figure 5:
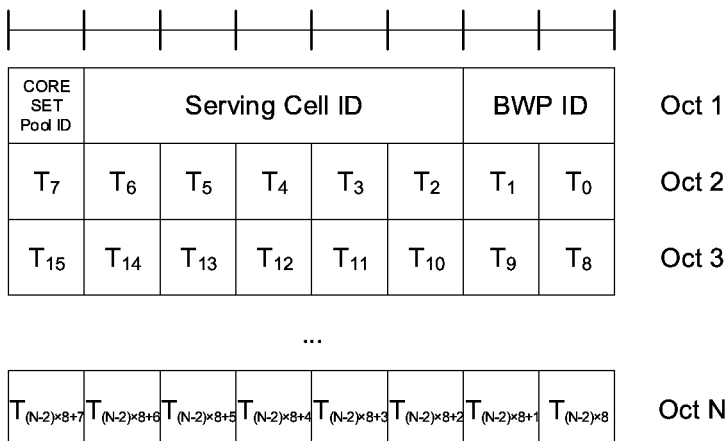
FIG. 5 is a reproduction of FIG. 6.1.3.14-1: TCI States Activation/Deactivation for UE-specific PDSCH MAC CE from 3GPP TS 38.321 v16.5.0.
Figure 6:
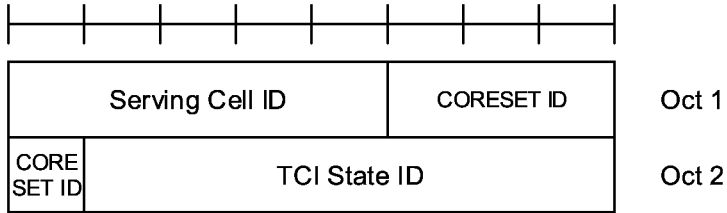
FIG. 6 is a reproduction of FIG. 6.1.3.15-1: TCI State Indication for UE-specific PDCCH MAC CE from 3GPP TS 38.321 v16.5.0.

FIG. 5 is a Reproduction of FIG. 6.1.3.14-1 from 3GPP TS 38.321 v16.5.0: TCI States Activation/Deactivation for UE-Specific PDSCH MAC CE.

6.1.3.15 TO State Indication for UE-Specific PDCCH MAC CE

The TCI State Indication for UE-specific PDCCH MAC CE is identified by a MAC subheader with LCID as specified in Table 6.2.1-1. It has a fixed size of 16 bits with following fields:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells in the set simultaneousTCI-UpdateList1 or simultaneousTCI-UpdateList2, respectively;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID: This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-StatesToAddModList and tci-StatesToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

FIG. 6 is a Reproduction of FIG. 6.1.3.15-1 from 3GPP TS 38.321 v16.5.0: TCI State Indication for UE-Specific PDCCH MAC CE.

6.1.3.18 PUCCH Spatial Relation Activation/Deactivation MAC CE

The PUCCH spatial relation Activation/Deactivation MAC CE is identified by a MAC subheader with LCID as specified in Table 6.2.1-1. It has a fixed size of 24 bits with following fields:

Serving Cell ID: This field indicates the identity of the Serving Cell for which the MAC CE applies. The length of the field is 5 bits;

BWP ID: This field indicates a UL BWP for which the MAC CE applies as the codepoint of the DCI bandwidth part indicator field as specified in TS 38.212 [9]. The length of the BWP ID field is 2 bits;

PUCCH Resource ID: This field contains an identifier of the PUCCH resource ID identified by PUCCH-ResourceId as specified in TS 38.331 [5]. The length of the field is 7 bits;

$S_i$: If, in PUCCH-Config in which the PUCCH Resource ID is configured, there is a PUCCH Spatial Relation Info with PUCCH-SpatialRelationInfoId as specified in TS 38.331 [5], configured for the uplink bandwidth part indicated by BWP ID field, S1 indicates the activation status of PUCCH Spatial Relation Info with PUCCH-SpatialRelationInfoId equal to i+1, otherwise MAC entity shall ignore this field. The S1 field is set to 1 to indicate PUCCH Spatial Relation Info with PUCCH-SpatialRelationInfoId equal to i+1 shall be activated. The S1 field is set to 0 to indicate PUCCH Spatial Relation Info with PUCCH-SpatialRelationInfoId equal to i+1 shall be deactivated. Only a single PUCCH Spatial Relation Info can be active for a PUCCH Resource at a time;

R: Reserved bit, set to 0.

Figure 7:
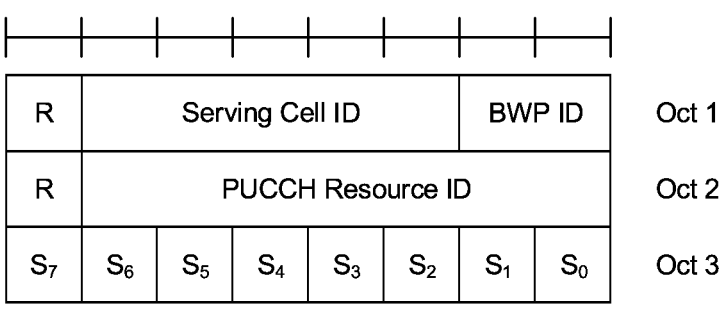
FIG. 7 is a reproduction of FIG. 6.1.3.18-1: PUCCH spatial relation Activation/Deactivation MAC CE from 3GPP TS 38.321 v16.5.0.

FIG. 7 is a Reproduction of FIG. 6.1.3.18-1 from 3GPP TS 38.321 v16.5.0: PUCCH Spatial Relation Activation/Deactivation MAC CE 6.1.3.24 Enhanced TCI States Activation/Deactivation for UE-Specific PDSCH MAC CE The Enhanced TCI States Activation/Deactivation for UE-specific PDSCH MAC CE is identified by a MAC PDU subheader with eLCID as specified in Table 6.2.1-1b. It has a variable size consisting of following fields:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-Updatelist1 or simultaneousTCI-UpdateList2, respectively;

BWP ID: This field indicates a DL BWP for which the MAC CE applies as the codepoint of the DCI bandwidth part indicator field as specified in TS 38.212 [9]. The length of the BWP ID field is 2 bits;

$C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present;

TCI state ID$_{i,j}$: This field indicates the TCI state identified by TCI-StateId as specified in TS 38.331 [5], where i is the index of the codepoint of the DCI Transmission configuration indication field as specified in TS 38.212 [9] and TCI state ID$_{i,j}$ denotes the j$^{th}$ TCI state indicated for the i$^{th}$ codepoint in the DCI Transmission Configuration Indication field. The TCI codepoint to which the TCI States are mapped is determined by its ordinal position among all the TCI codepoints with sets of TCI state ID$_{i,j}$ fields, i.e. the first TCI codepoint with TCI state ID$_{0,1}$ and TCI state ID$_{0,2}$ shall be mapped to the codepoint value 0, the second TCI codepoint with TCI state ID$_{1,1}$ and TCI state ID$_{1,2}$ shall be mapped to the codepoint value 1 and so on. The TCI state ID$_{i,2}$ is optional based on the indication of the C$_i$ field. The maximum number of activated TCI codepoint is 8 and the maximum number of TCI states mapped to a TCI codepoint is 2.

R: Reserved bit, set to "0".

Figure 8:
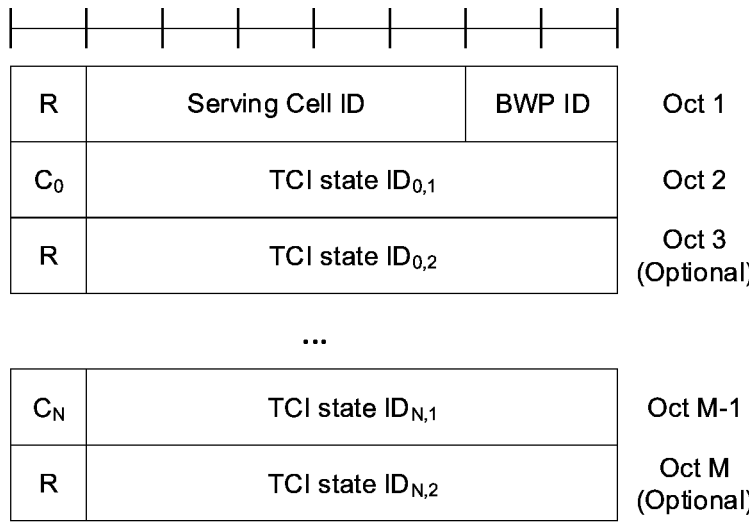
FIG. 8 is a reproduction of FIG. 6.1.3.24-1: Enhanced TCI States Activation/Deactivation for UE-specific PDSCH MAC CE from 3GPP TS 38.321 v16.5.0.

FIG. 8 is a Reproduction of FIG. 6.1.3.24-1 from 3GPP TS 38.321 v16.5.0: Enhanced TCI States Activation/Deactivation for UE-Specific PDSCH MAC CE In 3GPP RAN1 #105[5] and RAN1 #106 meeting [6], UE-initiated beam selection is discussed:

Agreement

On Rel. 17 enhancements to facilitate advanced beam refinement/tracking, focus study (including down-selection) and, if needed, specification effort on the following options:

Group 1: Aim for at most one solution for Group 1 in Rel-17 to address issue 6

Opt 1-A. UE-initiated beam selection/activation based on beam measurement and/or reporting (without beam indication or activation from NW)

Opt 1-B. Beam measurement/reporting/refinement/selection triggered by beam indication (without CSI request)

Opt 1-C. Aperiodic beam measurement/reporting based on multiple resource sets for reducing beam measurement latency Group 2: Aim for at most one solution for Group 2 in Rel-17 to address issue 6

Opt 2-A: Latency reduction for MAC CE based TCI state activation, or frequency/time/beam tracking Opt 2-B: Latency reduction for MAC CE based PL-RS activation Opt 2-C: One-shot timing update for TCI state update Agreement On Rel-17 enhancements to facilitate advanced beam refinement/tracking, in Rel-17, further focus study (including down-selection) and, if needed, specification effort on Opt 1-A as agreed in RAN1 #105-c (UE-initiated beam selection/activation based on beam measurement and/or reporting, without beam indication or activation from NW) comprising:

UE-initiated (DL-only or DL/UL) beam selection, including the following options

Opt1. The selected beam is reported by an event-triggered UE beam reporting via, e.g. UCI, MAC CE, UL CG, or Type 1/Type 2 CBRA/CFRA Opt2. The selected beam is reported by a legacy UE beam report (NW-configured)

FFS on triggering condition and NW-indication of a beam group in which the UE is allowed to do the beam selection, e.g., the NW-indication via MAC-CE FFS: NW confirmation, e.g. if no NW beam selection command overwriting the selected beam is received in a time window after the report UE-initiated beam activation based on beam reporting The reported beam(s) are activated as active TCI/spatial relation RS(s) automatically w/o NW activation command after receiving gNB response signalling, e.g. DCI/MAC CE FFS: The reported beam is applied directly if the number of supported activated beam by the UE is one and/or after receiving gNB response signaling, or if no NW activation command overwrites the beam(s) activated by the report in a time window after the report UE-initiated UL-only beam selection considering potential misalignment between network and UE on the selected beams The UE can select an alternative beam from the other beams in the gNB-configured set containing more than one UL beam Agreement On Rel. 17 enhancements to facilitate UE-initiated panel activation and selection, down select or modify from the following two schemes in RAN1 #106bis-e:

Scheme 1:

A panel entity corresponds to a reported CSI-RS and/or SSB resource index in a beam reporting instance (i.e. Opt1-1 per RAN1 #104-bis-e agreement)

The correspondence between a panel entity and a reported CSI-RS and/or SSB resource index is informed to NW FFS: Detailed design of how to inform the correspondence to NW Note: the correspondence between a CSI-RS and/or SSB resource index and a panel entity is determined by the UE (analogous to Rel-15/16)

Support UE reporting of maximum number of SRS ports and coherence type for each panel entity as a UE capability Support multiple codebook-based SRS resource sets with different maximum number of SRS ports The indicated SRI is based on the SRS resources corresponding to one SRS resource set, where the SRS resource set should be aligned with the UE capability for the panel entity Scheme 2:

Support UE reporting one of the following (to be down selected in RAN1 #106bis-e):

Opt1. A list of supported UL ranks (number of UL transmission layers)

Opt2. A list of supported number of SRS antenna ports

Opt3. A list of coherence types (as in Rel-15) indicating a subset of ports

The NW configures an association between an rank index and rank/number of SRS antenna ports/coherence type Include at least one of the index, the maximum UL rank or SRS antenna ports or coherence type corresponding to a reported SSBRI/CRI in a beam reporting instance FFS: timeline to apply above result in the beam report instance Support multiple codebook-based SRS resource sets with different number of SRS antenna ports The indicated SRI is based on the SRS resources corresponding to one SRS resource set, where the SRS resource set should be aligned with the UE reported info corresponding to the index In New Radio (NR) enhancements on Multiple-Input Multiple-Output (eMIMO) work item, multi-Transmission/ Reception Point (TRP) operation is introduced. A User Equipment (UE) could perform communication with a cell of a network (e.g., Next Generation Node B (gNB)) via more than one TRP(s) of the cell. In Rel-16, multi-Physical Downlink Shared Channel (PDSCH) transmission is introduced. The UE could be indicated with two (activated) Transmission Configuration Indication (TCI) states for receiving (two) PDSCH transmission occasions. Each TCI state could be associated with a PDSCH transmission. The PDSCH transmissions could have non-overlapping frequency and/or time domain resource allocation with respect to the other PDSCH transmission occasion. In NR release 17 work item on MIMO enhancements (e.g., [1] RP-193133 New WID: Further enhancements on MIMO for NR), multi-TRP transmission for Physical Uplink Control Channel (PUCCH), Physical Uplink Shared Channel (PUSCH), and Physical Downlink Control Channel (PDCCH) is introduced. The goal of multi-TRP PUSCH is for the UE to transmit a same data via multiple PUSCH to a network to achieve reliability (e.g., using spatial diversity of multiple TCI states or beams). In Rel-16 beam management for Downlink (DL)/Uplink (UL) channels of a UE, the network could configure/indicate beam reporting to the UE for activate/switching beams for different channels (e.g., via Medium Access Control (MAC) Control Element (CE) or indicated via control signals).

In Release 17 NR, advanced beam refinement and/or tracking is discussed. The goal could include reducing DL signaling associated with beam management to reduce latency and reducing activation delay of TCI state(s) and pathloss reference signals (PL RSs). In order to reduce DL signaling for beam management (e.g., DL/UL beam switching), UE-initiated beam reporting/refinement/selection/activation is discussed. The UE could report quality of (group of) beam and select/activate beam based on beam measurement and/or reporting (without indication or activation from a network).

Whether to Apply to all Channels, all DL Channels, all UL Channels, or a Specific Channel:

DL Channel

The first concept of the invention is that a UE could select and/or activate a first one or more beam(s) for a DL channel based on at least one of a beam quality or a beam report associated with the first one or more beam(s). The UE could determine whether to activate the first one or more beam(s) based on the beam quality or the beam report associated with the one or more beam(s). The UE could transmit or report the beam quality to a network. The beam quality could be reported or transmitted in a beam report (or a measurement report). The beam report could include or indicate at least (identity or index of) the first one or more beams(s) and/or the beam quality of the one or more beam(s) (e.g., the beam report could also include beam quality or indicate beams other than the first one or more beam(s)). The UE could activate the first one or more beam(s) in response to triggering, generation, and/or transmission of the beam report. The UE could deactivate a second one or more beam(s) in response to beam quality or beam report of the first one or more beam(s). The UE may not activate or select the one or more beam(s) in response to a signaling, activation, and/or indication received from a network. The UE could activate or select the one or more beam(s) not in response to a signaling, activation, and/or indication received from a network. Additionally and/or alternatively, the UE could activate the selected beam(s) in response to acknowledgement or indication received from the network. The UE may not select and/or activation one or more beam(s) for an UL channel (e.g., PUSCH or PUCCH) based on reporting or measured quality.

The DL channel could be PDCCH and/or PDSCH. Additionally and/or alternatively, the UE may not select and/or activate one or more beam(s) and/or TCI state and/or TCI codepoint for PDSCH. The UE could select and/or activate one or more beam(s) only for PDCCH.

The beam report could be associated with a periodic beam report (e.g., periodic Channel State Information (CSI) reporting configured by the network). Additionally and/or alternatively, the beam report could be associated with an aperiodic beam report (triggered or indicated by the network via a network signaling).

Additionally and/or alternatively, the beam report could be associated with an event-triggered or UE-initiated beam report. For example, the UE could trigger and/or transmit the beam report in response to a beam quality of a first (activated) beam is lower than a beam quality of a second (deactivated) beam. Additionally and/or alternatively, the UE could trigger or transmit a beam report in response to a beam quality of a (activated) beam is lower than (or equal to) a threshold. Additionally and/or alternatively, the UE could trigger or transmit a beam report in response to a beam quality of a (activated) beam is lower than (or equal to) a threshold, and a beam quality of a (deactivated) beam is higher than (or equal to) a second threshold.

PDCCH

The UE could determine whether to select or activate/use a first beam for monitoring or receiving PDCCH (of a cell or a Bandwidth Part (BWP)) based on at least beam quality of the first beam. The UE could determine whether to deactivate a second beam for monitoring or receiving the PDCCH based on beam quality of the beam.

For example, a UE could be configured with PDCCH (e.g., via PDCCH-Config) for a BWP of a Cell. The UE could be configured with one or more Control Resource Set (CORESET) (e.g., via parameter ControlResourceSet) for the PDCCH. The UE could be configured or indicated with a beam or a TCI state for (monitoring) each CORESET.

For an instance, the UE uses a first beam to monitor Downlink Control Information (DCI) on a first CORESET (of the PDCCH), and uses a second beam to monitor DCI on a second CORSET of the PDCCH. Alternatively, the UE could use the same beam to monitor DCI on all CORESETs of the PDCCH.

The UE could be configured with a beam report for (the BWP of) the Cell based on a beam reporting configuration (e.g., CSI-ReportConfig). The beam report could be periodic reporting. The beam report could be aperiodic or semi-persistent reporting. The beam report could be event-triggered. In response to triggering or initiation of the beam report, the UE could measure or obtain beam quality of a set of beams. The set of beams could be associated with (or indicated in) the beam reporting configuration. The set of beams could include activated beams for monitoring DCI, and/or the set of beams could include deactivated beams or beams that are not used for monitoring/receiving DL channels. Based on the beam quality of the set of beams and/or the beam report, the UE could determine to activate one or more new beam for monitoring the one or more CORESET. The UE could determine to deactivate (old or previous) beam(s) used for monitoring the one or more CORESET.

PDCCH: Whether Replacement of Activated Beam is Applied to all or Some of CORESETs Additionally and/or alternatively, the UE could determine to activate/select a new beam for all CORESETs (of an active BWP) of the PDCCH, e.g., based on at least one of the beam quality, the beam report, or whether the UE is configured with multi-TRP operation (for PDCCH). For example, the UE could select a third beam with the highest beam quality (e.g., Reference Signal Received Power (RSRP) or Signal Interference+Noise Ratio (SINR)) and activate the third beam for monitoring DCI for all CORESETs of the PDCCH. The UE could deactivate all other (previous) beams for monitoring DCI before activating the third beam. The UE could be performing single-TRP operation on the Cell associated with the PDCCH. The UE could select one new beam for all CORESET of a BWP of the Cell if or when the UE performs single-TRP operation (for PDCCH) on the Cell.

Additionally and/or alternatively, the UE could determine to activate/select a first new beam for a first part of the one or more CORESET(s) of the PDCCH, and determine to activate/select a second new beam for a second part of the one or more CORESET(s), e.g., based on at least one of the beam quality, the beam report, or whether the UE is configured with multi-TRP operation (for PDCCH). The first new beam may not be associated with a same TRP (of the Cell) as the second new beam. The first part of the one or more CORESET(s) could be associated with a first TRP. The second part of the one or more CORESET(s) could be associated with a second TRP. For example, the UE could select a first new beam that has the highest RSRP for monitoring DCI for a first CORESET and select a second new beam that has the second highest RSRP for monitoring DCI for a second CORESET. For another example, for a PDCCH with 2 CORESETs, the UE could select 2 beams with first two highest beam quality measured in response to a beam report, the UE could determine which beam to use for which CORESET based on index of the CORESET and the beams. In one example, the UE could map the beams to the CORESETs by the index value in ascending order (e.g., map the beam with smaller beam index to CORESET id 1, and map the beam with larger beam index to CORESET id 2). The UE could select different new beams for different CORESETs of PDCCH of BWP of the Cell if or when the UE performs multi-TRP operation (for PDCCH) on the Cell.

Additionally and/or alternatively, the UE could determine to not activate one or more new beams for a second part of the one or more CORESETs of the PDCCH, e.g., based on at least one of the beam quality, the beam report, or whether the UE is configured with multi-TRP operation (for PDCCH). The UE could determine to activate/select a first new beam for a first part of the one or more CORESET(s) of the PDCCH, e.g., based on at least one of the beam quality, the beam report, or whether the UE is configured with multi-TRP operation (for PDCCH). For example, the (currently) activated beam used by the UE to monitor a CORESET could be the beam with highest beam quality. For another example, the UE may not switch or deactivate the (currently) activated beam for monitoring a CORESET when or if the (currently) activated beam used by the UE is associated with or has a beam quality above a threshold. The UE could determine to not switch/activate/select new beam(s) for a CORESET if or when the currently activated beam for the CORESET has a beam quality higher than a threshold.

Figure 9:
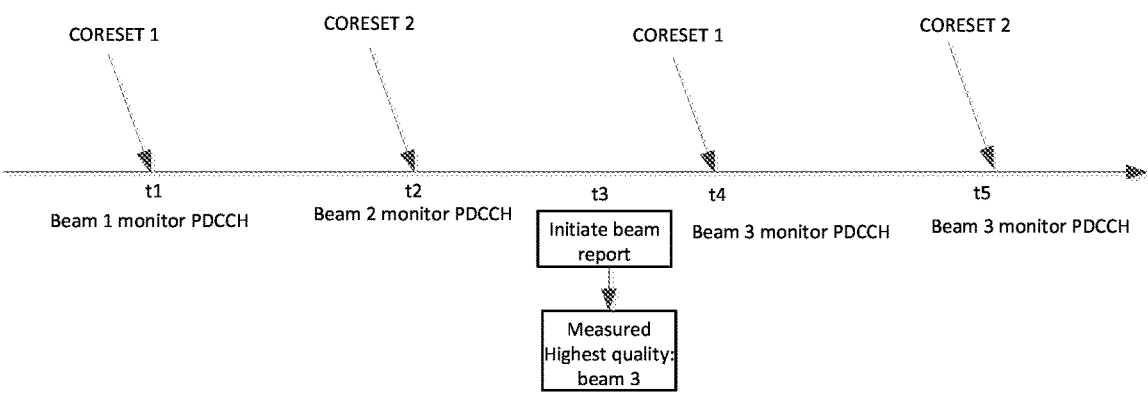
FIG. 9 shows an example where a UE could be configured with 2 CORESETs (CORESET 1 and CORESET 2) to monitor PDCCH on a (BWP of a) Cell, in accordance with embodiments of the present invention.

An example is shown in FIG. 9. A UE could be configured with 2 CORESETs (CORESET 1 and CORESET 2) to monitor PDCCH on a (BWP of a) Cell. The UE could be indicated with beam 1 to monitor CORESET 1 and beam 2 to monitor CORESET 2 on PDCCH. At t3, the UE could initiate or trigger a beam report (periodic, aperiodic, or event-triggered beam report). The UE could measure beam quality of one or more beams (e.g., including beam1, beam 2, and beam 3) (before triggering or initiating of the beam report). Based on the measurement, the UE could determine that beam 3 has the highest beam quality (among the one or more beams, and the beam quality is above a threshold). Based on the measurement or the beam report, the UE could select or activate the beam 3 to monitor CORESET 1 and CORESET2 on PDCCH. The UE could deactivate beam 1 and beam 2 in response to the measurement or the beam report.

Figure 9A:
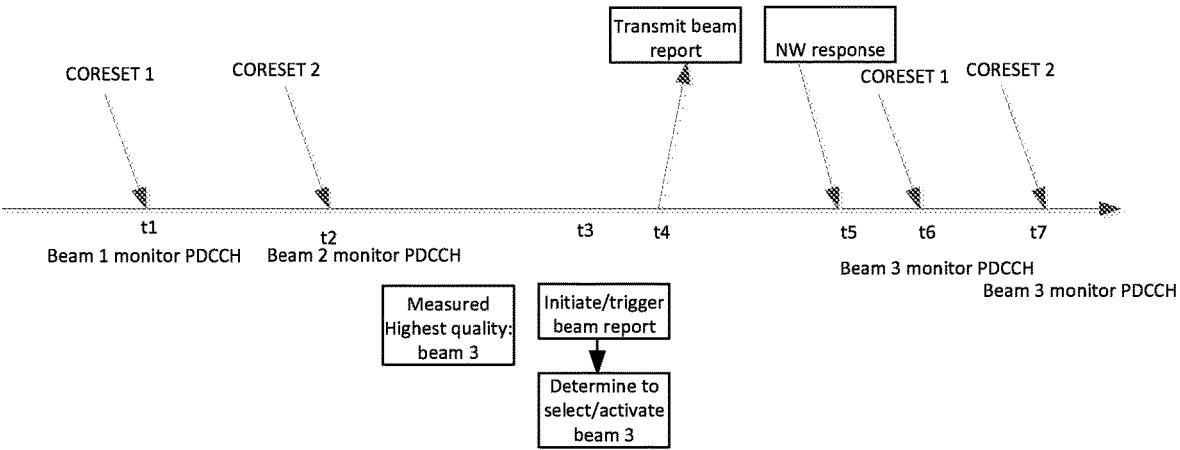
FIG. 9A shows an example where a UE could be configured with 2 CORESETs (CORESET 1 and CORESET 2) to monitor PDCCH on a (BWP of a) Cell, in accordance with embodiments of the present invention.

Another example is shown in FIG. 9A. A UE could be configured with 2 CORESETs (CORESET 1 and CORESET 2) to monitor PDCCH on a (BWP of a) Cell. The UE could be indicated with beam 1 to monitor CORESET 1 and beam 2 to monitor CORESET 2 on PDCCH. At t3, the UE could initiate or trigger a beam report (periodic, aperiodic, or event-triggered beam report). The UE could measure beam quality of one or more beams (e.g., including beam1, beam 2, and beam 3) (before triggering or initiating of the beam report). Based on the measurement, the UE could determine that beam 3 has the highest beam quality (among the one or more beams, and the beam quality is above a threshold). Based on the measurement or the beam report, the UE could select or activate the beam 3 to monitor CORESET 1 and CORESET2 on PDCCH. At t4, the UE transmits a beam report to the network. The beam report could contain or indicate beam quality and/or activated beam (e.g., beam 3) and/or associated CORESET with activated new beam (CORESET 1 and CORESET2). The network could send a response at t5 indicating acknowledgment of the beam report. In response to the response, the UE could monitor CORESET1 and 2 via beam 3.

Figure 10:
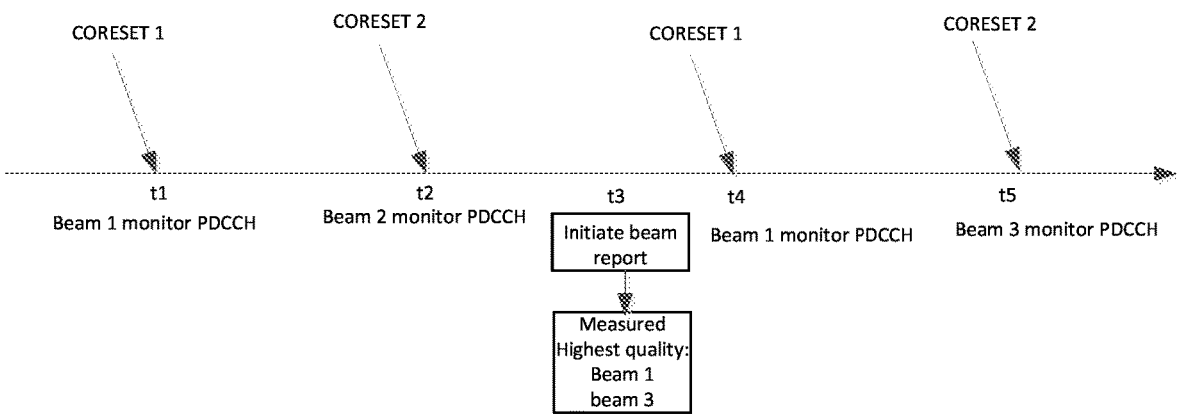
FIG. 10 shows an example where a UE could be configured with 2 CORESETs (CORESET 1 and CORESET 2) to monitor PDCCH on a (BWP of a) Cell, in accordance with embodiments of the present invention.

Another example is shown in FIG. 10. A UE could be configured with 2 CORESETs (CORESET 1 and CORESET 2) to monitor PDCCH on a (BWP of a) Cell. The UE could be indicated with beam 1 to monitor CORESET 1 and beam 2 to monitor CORESET 2 on PDCCH. At t3, the UE could initiate a beam report (periodic, aperiodic, or event-triggered beam report). The UE could measure beam quality of one or more beams including beam 1, beam 2, and beam3. Based on the measurement, beam 1 and beam 3 has the highest and the second highest beam quality (e.g., two highest beam quality that is above a threshold). Alternatively or additionally, beam quality of the beam 1 is higher than or equal to a threshold. The UE could select, based on the beam report or based on the measurement, beam 1 for monitoring CORESET 1 (e.g., not selecting a new beam other than beam 1 to monitor CORESET 1) and select beam 3 for monitoring CORESET 2. The UE could activate/use beam 3 to monitor PDCCH at t5 in response to or based on the UE transmitting the beam report. Alternatively, the UE could activate/use beam 3 to monitor PDCCH at t5 in response to or based on receiving a response (e.g., positive acknowledgement) associated with the beam report from the network.

Figure 11:
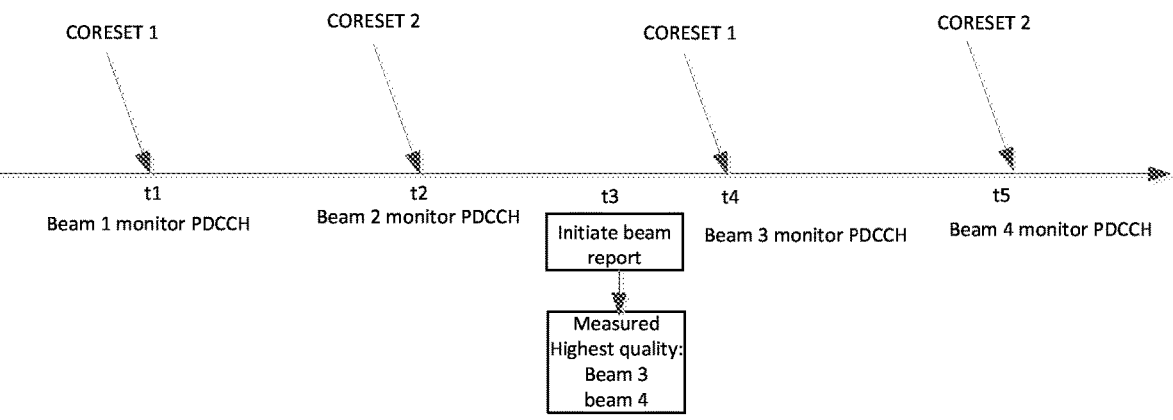
FIG. 11 shows an example where a UE could be configured with 2 CORESETs (CORESET 1 and CORESET 2) to monitor PDCCH on a (BWP of a) Cell, in accordance with embodiments of the present invention.

An example is shown in FIG. 11. A UE could be configured with 2 CORESETs (CORESET 1 and CORESET 2) to monitor PDCCH on a (BWP of a) Cell. The UE could be indicated with beam 1 to monitor CORESET 1 and beam 2 to monitor CORESET 2 on PDCCH. At t3, the UE could initiate a beam report (periodic, aperiodic, or event-triggered beam report). The UE could measure beam quality of one or more beams (e.g., including beam1, beam 2, beam 3 and beam 4). Based on the measurement, the UE could determine that beam 3 and beam 4 have the first and second highest beam quality (among the one or more beams, and the beam quality is above a threshold). Based on the measurement or the beam report, the UE could select or activate the beam 3 to monitor CORESET 1 and select or activate beam 4 to monitor CORESET2 on PDCCH. Alternatively, in response to a response from the network associated with the measurement or the beam report, the UE could select or activate the beam 3 to monitor CORESET 1 and select or activate beam 4 to monitor CORESET2 on PDCCH. The UE could deactivate beam 1 and beam 2 in response to the measurement or the beam report. Alternatively, the UE could deactivate beam 1 and beam 2 in response to a response from the network associated with the measurement or the beam report.

Select the Beam with Same TRP as the Previous Beam Only

Additionally and/or alternatively, the UE could select a new beam for monitoring a CORESET (among the one or more CORESET) (of the PDCCH), wherein the new beam may not be associated with a different TRP than a previous beam used to monitor the CORESET. The UE could select a new beam associated with the same TRP as the previous beam. The UE may not (be allowed to) select a new beam associated with different TRP from that associated with the previous beam. The new beam could be associated with or be detected/derived with a beam quality higher than or equal to a threshold. Additionally and/or alternatively, the new beam could be associated with the same CORESET pool as the previous beam.

Additionally and/or alternatively, the UE could select/ activate a (same) new beam for one or more UL and/or DL channel(s), wherein each of the one or more UL and/or DL channel is associated with a (different) Cell. The UE could select or activate a same new beam for more than one Cells simultaneously based on or in response to a beam report or beam measurement associated with at least one of the more than one Cells. The more than one Cells could be Cells configured in simultaneousTCI-UpdateList1.

Additionally and/or alternatively, based on or in response to a beam report or beam measurement associated with a Cell, the UE could select/activate a new beam for one or more CORESET of (only) the Cell, and the UE may not select/activate a new beam for other Cells configured in a same TCI update list (e.g., simultaneousTCI-UpdateList1 or simultaneousTCI-Updatelist2) with the Cell. The other Cells may not be associated with the beam report or beam measurement.

For example, the UE could indicate at least one beam in a report (to network). And the UE could activate a beam of the at least one beam for all CORESETs of a cell (for a TRP of the cell) in response to (or based on) the report. The beam could have highest beam quality among the at least one beam. The report could be a beam report or a beam selection report. The at least one beam could be associated with the same TRP. Alternatively, the at least one beam could be associated with different TRPs.

For example, the UE could indicate a beam and a CORESET corresponding to the beam in a report (to network). And the UE could activate the beam for the CORESET in response to (or based on) the report. The report could be a beam report or a beam selection report. Beams indicated by the report could be associated with the same TRP. Alternatively, the beams indicated by the report could be associated with different TRPs. CORESETs indicated by the report could be associated with the same TRP. Alternatively, the CORESETs indicated by the report could be associated with different TRPs. The report could indicate all CORESETs configured for (a TRP of) a cell. The report could indicate part of CORESETs configured for (a TRP of) a cell. Beam(s) corresponding to the part of CORESETs is to be changed in response to (or based on) the report.

For example, the UE could indicate an activated beam and a beam to replace the activated beam in a report (to network). And the UE could activate the beam for CORESET (s) associated with the activated beam. In other words, the UE could change from monitoring PDCCH on the CORESET(s) via the activated beam to monitoring PDCCH on the CORESET(s) via the beam. The report could be a beam report or a beam selection report. Beams indicated by the report could be associated with the same TRP. Alternatively, the beams indicated by the report could be associated with different TRPs.

PDSCH

Additionally and/or alternatively, the UE could determine whether to select or activate one or more beam(s) for monitoring or receiving PDSCH (of a cell or a BWP of the Cell), e.g., based on at least one of a beam report, a beam quality associated with the one or more beam(s), or whether the UE is configured with multi-TRP operation (for PDSCH). The UE could determine whether to select or activate one or more beam(s) for one or more activated codepoints for monitoring or receiving PDSCH (of a cell or a BWP of the Cell), e.g., based on at least one of the beam report, the beam quality associated with the one or more beam(s), or whether the UE is configured with multi-TRP operation (for PDSCH). Additionally and/or alternatively, the UE could determine whether to deactivate a second one or more beam(s) associated with an activated TCI codepoint based on beam quality associated with the second one or more beam(s) mapped to the activated TCI codepoint.

Additionally and/or alternatively, the UE could determine whether to select or activate/use a first beam for monitoring or receiving PDSCH (of a cell or a BWP) based on at least beam quality of the first beam. The UE could determine whether to deactivate a second beam for monitoring or receiving the PDSCH based on beam quality of the second beam.

Additionally and/or alternatively, the UE could select or activate one or more beam(s) for one or more (activated) TCI codepoints in response to or based on a beam report. For example, for each activated TCI codepoint, the UE could select or activate at most 2 beam(s) (or 2 TCI states) in response to a beam report or a beam quality. The UE could deactivate previous beam(s) associated with each activated TCI codepoint which were activated before the beam report. The UE could determine whether to activate/switch a new beam for a TCI codepoint based on at least whether one (or both) currently activated beam(s) is associated with beam quality higher or lower than a threshold. For example, the UE may not activate new beam(s) for a TCI codepoint if or when one or both currently activated beam(s) of the TCI codepoint has beam quality higher than a threshold. Additionally and/or alternatively, for a TCI codepoint mapping to a first beam with beam quality lower than a threshold and a second beam with beam quality higher than a threshold, the UE could activate/select a new beam for the TCI codepoint and deactivate the first beam (and may not deactivate the second beam).

The UE could switch/select or activate one or more beam(s) for more than one (activated) TCI codepoint in response to or based on a beam report or beam quality. The UE could select different new beams for mapping to different TCI codepoints. Alternatively, the UE could select or activate same (set of) beams for mapping to more than one (activated) TCI codepoints in response to or based on the beam report or beam quality.

Alternatively, the UE could select or activate one or more beam(s) for a single (activated) TCI codepoint based on or in response to a beam report. The UE may not switch/select or activate one or more beam(s) for more than one (activated) TCI codepoint based on or in response to the beam report. The single TC codepoint could be the smallest value (e.g., codepoint 0). Additionally and/or alternatively, the single TCI codepoint could be associated with or mapped to beam(s) which has lowest beam quality among (all) beam(s) associated to with or mapped to the one or more TCI codepoints.

Each of the one or more TCI codepoints could be associated with one or more (e.g., 1 or 2) TCI states. The one or more TCI codepoints could be indicated in a DCI from a network associated with PDSCH transmissions.

PDSCH: Whether Replacement of Activated Beam is Applied to all or Some of Codepoints of TCI Field The UE could select/activate a number of new beam(s) for (mapping to) a TCI codepoint for PDSCH, e.g., based on at least one of beam report, beam quality, or whether the UE is configured with multi-TRP operation (for PDSCH). The number of the new beam(s) could be the same as the number of previous beams mapped to the TC codepoint. The number of new beam(s) may not be (or is not allowed to be) different from the number of the previous beam(s) mapped to the TCI codepoint.

Additionally and/or alternatively, the number of the new beam(s) could (only) be one.

Additionally and/or alternatively, the number of the new beams could be different from the number of previous beams mapped to the TCI codepoint.

Additionally and/or alternatively, the number of the new beams may not be larger than the number of previous beams mapped to the TCI codepoint.

Additionally and/or alternatively, the number of the new beams may not be smaller than the number of previous beams mapped to the TCI codepoint.

For example, a UE could be indicated by a network with 8 activated TCI codepoints for a BWP of a Cell. A first TC codepoint could be associated with or mapped to 2 previous beams (indicated by 2 TC state ids). The UE could trigger or initiate a beam report for the (BWP or the) Cell (e.g., initiate periodically or via network indication). The UE could obtain beam quality of one or more beams (including the 2 beams associated with the first TCI codepoint). The UE could determine which beams to replace based on the beam quality of the one or more beams. The UE could select or activate 2 new beams for mapping to the first TCI codepoint (e.g., based on beam quality of the 2 new beams is higher than a threshold or are highest among the one or more beams). Additionally and/or alternatively, the UE could select or activate 1 new beam for mapping to the first TC codepoint (e.g., based on beam quality of the 1 new beam is higher than a threshold or is the highest among all measured beams).

Additionally, a second TCI codepoint could be associated with or mapped to 1 (single) previous beam (indicated by 1 TC state id). The UE could select or activate 1 (single) new beam for mapping to the second TCI codepoint (e.g., based on beam quality of the new beam is higher than a threshold or is the highest among the one or more beams). Additionally and/or alternatively, the UE could select or activate 2 new beams for mapping to the second TCI codepoint. Alternatively, the UE may not (or is not allowed to) select or activate 2 new beams for mapping to the second TCI codepoint (since the second TCI codepoint is associated with only one previous beam).

Change Only One TCI Codepoint (Based on Index or Based on Beam Quality)

Additionally and/or alternatively the UE could activate or select a new beam (TCI state) for a single activated TC codepoint for each beam report. The UE could determine to which TCI codepoint to activate or select new beam based on index of the TCI codepoint or beam quality associated with beams of the TCI codepoint.

For another example, a UE could be indicated by a network with 2 activated TCI codepoints. A first TCI codepoint could be associated with a first previous beam (indicated by first TCI state id), and a second TCI codepoint could be associated with a second previous beam (indicated by second TC state id). The UE could initiate or trigger a beam report and perform measurement on one or more beams (including the first previous beam and the second previous beam). According to the beam report or measurement, the first previous beam has the lowest beam quality among beams associated with activated TCI codepoints. Additionally and/or alternatively, the first previous beam has a beam quality lower than a threshold. The UE could select and/or activate a first new beam for the first TC codepoint. The UE could deactivate the first previous beam in response to the beam report.

The UE may not switch/select and/or activate the second previous beam for the second TCI codepoint. According to the beam report or measurement, the second previous beam has a beam quality lower than a threshold. The second previous beam has a beam quality higher than beam quality of the first previous beam.

Additionally and/or alternatively, the UE may not select or activate 2 beams associated with the same TRP of a Cell for an activated TCI codepoint. The UE could select or activate 2 beams associated with different TRPs of a Cell for an activated TCI codepoint for the (BWP of the) Cell.

Additionally and/or alternatively, the UE could select a new beam for a TCI codepoint (among the one or more TCI codepoints), wherein the new beam may not be associated with a different TRP than a previous beam mapped to the TCI codepoint. The UE could select a new beam associated with the same TRP as the previous beam (mapped to the TCI codepoint). The UE may not (be allowed to) select a new beam associated with different TRP from that associated with the previous beam. The new beam could be associated with or be detected/derived with a beam quality higher than or equal to a threshold. Additionally and/or alternatively, the new beam could be associated with the same CORESET pool as the previous beam.

Additionally and/or alternatively, for a DL semi-persistent scheduling (SPS) transmission associated with a codepoint, in response to or after activating/selecting one or more beam(s) for the (activated) TCI codepoint (based on beam report or beam measurement), the UE could receive DL SPS transmission via the activated/selected one or more beams (associated with the same TCI codepoint).

For example, the UE could indicate beam(s) for a TCI codepoint in a report (to network). The report could (explicitly) indicate the TC codepoint. Alternatively, the report may not (explicitly) indicate the TCI codepoint. The report could indicate all TCI codepoints, each has corresponding activated beam(s), for a cell. The UE could activate the beam for the TCI codepoints in response to or based on the report. The report could be a beam report or a beam selection report. Beams indicated by the report could be associated with the same TRP. Alternatively, the beams indicated by the report could be associated with different TRPs.

For example, the UE could indicate an activated beam and a beam to replace the activated beam in a report (to network). And the UE could activate the beam for TCI codepoint(s) associated with the activated beam. In other words, the UE could change from receiving PDSCH associated with a TCI codepoint via the activated beam to receiving PDSCH associated with the TCI codepoint via the beam. The report could be a beam report or a beam selection report. Beams indicated by the report could be associated with the same TRP. Alternatively, the beams indicated by the report could be associated with different TRPs.

Additionally and/or alternatively, the UE could select and/or activate a first one or more beam(s) for a UL channel based on at least one of a beam quality or a beam report associated with the one or more beam(s). The UE could determine whether to activate the first one or more beam(s) based on the beam quality or the beam report associated with the one or more beam(s). The UE could transmit or report the beam quality to a network. The beam quality could be reported or transmitted in a beam report (or a measurement report). The beam report could include or indicate at least (identity or index of) the first one or more beams(s) and/or the beam quality of the one or more beam(s) (e.g., the beam report could also include beam quality or indicate beams other than the first one or more beam(s)). The UE could activate the first one or more beam(s) in response to triggering, generation and/or transmission of the beam report. The UE could deactivate a second one or more beam(s) in response to beam quality or beam report of the first one or more beam(s). The UE may not activate or select the one or more beam(s) in response to a signaling, activation, and/or indication received from a network. The UE could activate or select the one or more beam(s) not in response to a signaling, activation, and/or indication received from a network. Additionally and/or alternatively, the UE could activate the selected beam(s) in response to acknowledgement or indication received from the network. The UE may not select and/or activate one or more beam(s) for an DL channel (e.g., PDSCH or PDCCH) based on reporting or measured quality.

The UL channel could be PUCCH and/or PUSCH. Additionally and/or alternatively, the UE may not select and/or activate one or more beam(s) and/or TCI state and/or TCI codepoint for PUSCH. The UE could select and/or activate one or more beam(s) only for PUCCH.

Additionally and/or alternatively, the UE could select or activate one or more beams for PUCCH, e.g., based on at least one of a beam report, a beam quality, or whether the UE is configured with multi-TRP operation (for PUCCH).

The UE could determine whether to select or activate one or more beam(s) for transmitting PUCCH (of a cell or a BWP of the Cell) for one or more PUCCH resource, associated with a PUCCH resource ID), e.g., based on at least one of a beam report, a beam quality associated with the one or more beam(s), or whether the UE is configured with multi-TRP operation (for PUCCH). Additionally and/or alternatively, the UE could determine whether to deactivate a second one or more beam(s) associated with the PUCCH resource ID, e.g., based on at least one of a beam report or a beam quality associated with the one or more beam(s), or whether the UE is configured with multi-TRP operation (for PUCCH).

Additionally and/or alternatively, the UE could determine whether to select or activate/use a first beam for transmitting PUCCH (of a cell or a BWP) based on at least beam quality of the first beam. The UE could determine whether to deactivate a second beam for transmit the PUCCH based on beam quality of the beam.

Additionally and/or alternatively, the UE could select or activate one or more beam(s) for one or more PUCCH resource(s) in response to or based on a beam report. For example, for each PUCCH resource, the UE could select or activate at most 2 beam(s) (or 2 TC states or 2 spatial relations) in response to a beam report or a beam quality. The UE could deactivate previous beam(s) associated with each PUCCH resource which were activated before the beam report. The UE could determine whether to activate/switch a new beam for a PUCCH resource based on at least whether one (or both) currently activated beam(s) is associated with beam quality higher or lower than a threshold. For example, the UE may not activate new beam(s) for a PUCCH resource if or when one or both currently activated beam(s) for the PUCCH resource has beam quality higher than a threshold. Additionally and/or alternatively, for a PUCCH resource mapping to a first beam with beam quality lower than a threshold and a second beam with beam quality higher than a threshold, the UE could activate/select a new beam for the PUCCH resource and deactivate the first beam (and may not deactivate the second beam).

The UE could switch/select or activate one or more beam(s) for more than one (e.g., or all) PUCCH resources in response to or based on a beam report or beam quality. The UE could select different new beams for mapping to different PUCCH resources. Alternatively, the UE could select or activate same (set of) beams for mapping to more than one PUCCH resource in response to or based on the beam report or beam quality (e.g., beam(s) with highest beam quality for all PUCCH resources).

Alternatively, the UE could select or activate one or more beam(s) for a single PUCCH resource based on or in response to a beam report. The UE may not switch/select or activate one or more beam(s) for more than one PUCCH resource based on or in response to the beam report. The single PUCCH resource could be the smallest index (e.g., with id 0). Additionally and/or alternatively, the single PUCCH resource could be associated with or mapped to beam(s) which has lowest beam quality among (all) beam(s) associated with or mapped to the one or more PUCCH resource(s).

Each of the one or more PUCCH resource(s) could be associated with one or more (e.g., 1 or 2) TCI states (or spatial relations).

Figure 12:
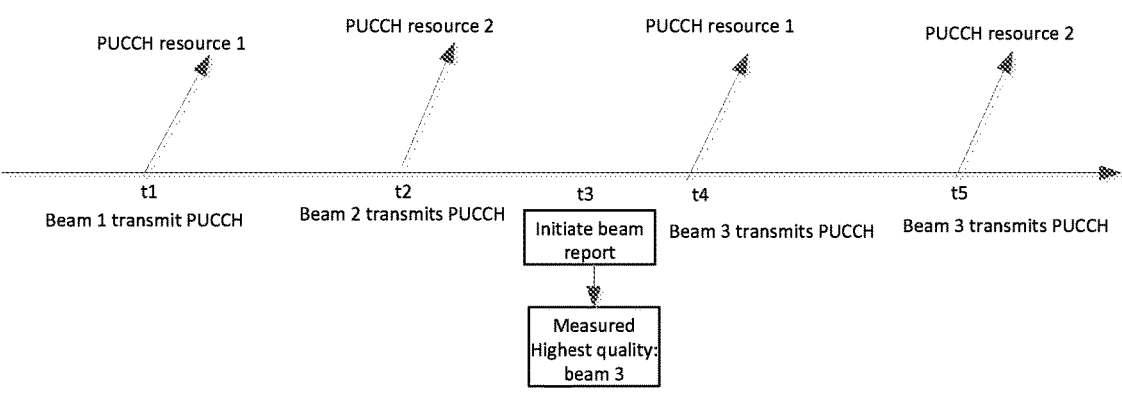
FIG. 12 shows an example where a UE could be configured with 2 PUCCH resources (PUCCH resource 1 and PUCCH resource 2) to transmit PUCCH on a (BWP of a) Cell, in accordance with embodiments of the present invention.

An example is shown in FIG. 12. A UE could be configured with 2 PUCCH resources (PUCCH resource 1 and PUCCH resource 2) to transmit PUCCH on a (BWP of a) Cell. The UE could be indicated with beam 1 to transmit on PUCCH resource 1 and beam 2 to transmit on PUCCH resource 2. At t3, the UE could initiate or trigger a beam report (periodic, aperiodic, or event-triggered beam report). The UE could measure beam quality of one or more beams (e.g., including beam1, beam 2, and beam 3) (before triggering or initiating of the beam report). Based on the measurement, the UE could determine that beam 3 has the highest beam quality (among the one or more beams, and the beam quality is above a threshold). Based on the measurement or the beam report, the UE could select or activate the beam 3 to transmit on PUCCH resource 1 and PUCCH resource 2. The UE could deactivate beam 1 and beam 2 in response to the measurement or the beam report.

Figure 12A:
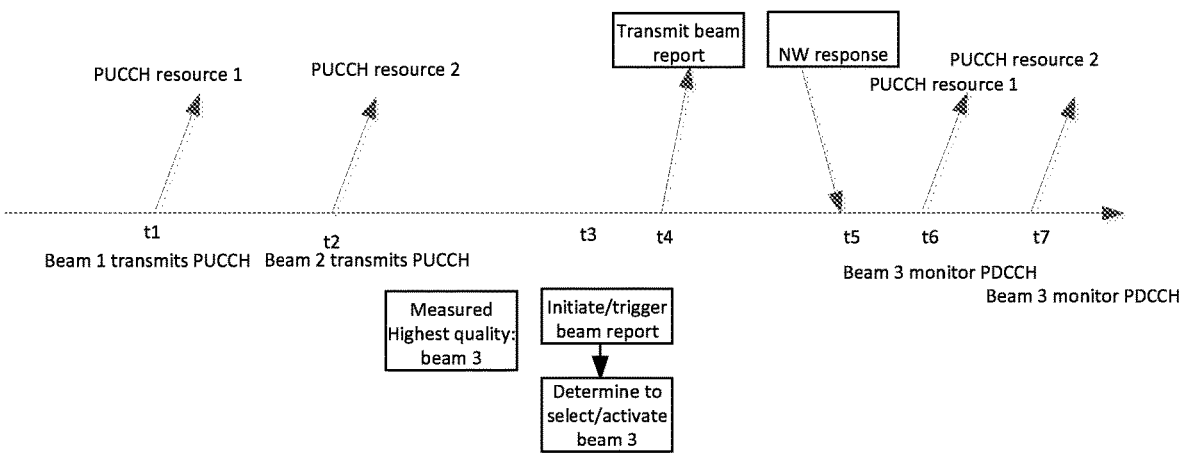
FIG. 12A shows an example where a UE could be configured with 2 PUCCH resources 1 and 2 to transmit PUCCH on a (BWP of a) Cell, in accordance with embodiments of the present invention.

Another example is shown in FIG. 12A. A UE could be configured with 2 PUCCH resources 1 and 2 to transmit PUCCH on a (BWP of a) Cell. The UE could be indicated with beam 1 to transmit on PUCCH resource 1 and beam 2 to transmits on PUCCH resource 2. At t3, the UE could initiate or trigger a beam report (periodic, aperiodic, or event-triggered beam report). The UE could measure beam quality of one or more beams (e.g., including beam1, beam 2, and beam 3) (before triggering or initiating of the beam report). Based on the measurement, the UE could determine that beam 3 has the highest beam quality (among the one or more beams, and the beam quality is above a threshold). Based on the measurement or the beam report, the UE could select or activate the beam 3 to transmit on PUCCH resource 1 and 2. At t4, the UE transmits a beam report to the network. The beam report could contain or indicate beam quality and/or activated beam (e.g., beam 3) and/or associated CORESET with activated new beam (CORESET 1 and CORESET2). The network could send a response at t5 indicating acknowledgment of the beam report. In response to the response, the UE could transmit on PUCCH resource 1 and 2 via beam 3. Alternatively, the UE may activate/ transmit on PUCCH resource 1 and 2 via beam 3 without (waiting for) the NW response (and activate in response to the transmitting of the beam report).

Figure 13:
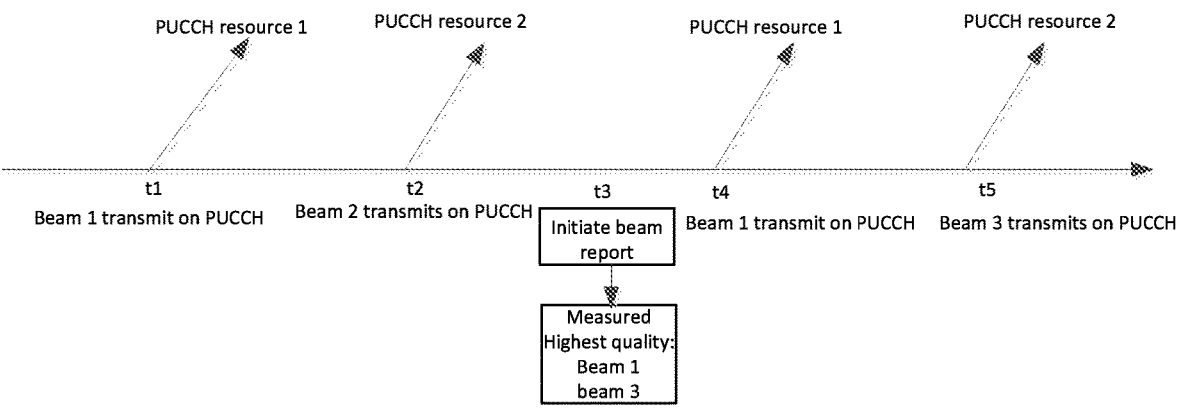
FIG. 13 shows an example where a UE could be configured with 2 PUCCH resources (PUCCH resource 1 and PUCCH resource 2) to transmits PUCCH on a (BWP of a) Cell, in accordance with embodiments of the present invention.

Another example is shown in FIG. 13. A UE could be configured with 2 PUCCH resources (PUCCH resource 1 and PUCCH resource 2) to transmits PUCCH on a (BWP of a) Cell. The UE could be indicated with beam 1 to transmit on PUCCH resource 1 and beam 2 to transmit on PUCCH resource 2. At t3, the UE could initiate a beam report (periodic, aperiodic, or event-triggered beam report). The UE could measure beam quality of one or more beams including beam 1, beam 2, and beam3. Based on the measurement, beam 1 and beam 3 has the highest and the second highest beam quality (e.g., two highest beam quality that is above a threshold). Alternatively or additionally, beam quality of the beam 1 is higher than or equal to a threshold. The UE could select, based on the beam report or based on the measurement, beam 1 to transmit on PUCCH resource 1 (e.g., not selecting a new beam other than beam 1 to monitor CORESET 1) and select beam 3 to transmit PUCCH resource 2.

Figure 14:
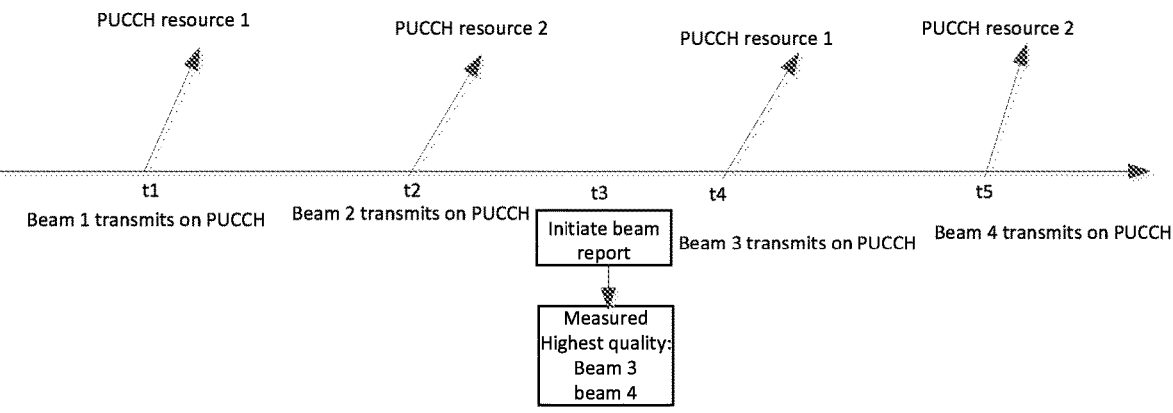
FIG. 14 shows an example where a UE could be configured with 2 PUCCH resources (PUCCH resource 1 and PUCCH resource 2) to transmits PUCCH on a (BWP of a) Cell, in accordance with embodiments of the present invention.

An example is shown in FIG. 14. A UE could be configured with 2 PUCCH resources (PUCCH resource 1 and PUCCH resource 2) to transmit PUCCH on a (BWP of a) Cell. The UE could be indicated with beam 1 to transmit on PUCCH resource 1 and beam 2 to transmit on PUCCH resource 2. At t3, the UE could initiate a beam report (periodic, aperiodic, or event-triggered beam report). The UE could measure beam quality of one or more beams (e.g., including beam1, beam 2, beam 3 and beam 4). Based on the measurement, the UE could determine that beam 3 and beam 4 have the first and second highest beam quality (among the one or more beams, and the beam quality is above a threshold). Based on the measurement or the beam report, the UE could select or activate the beam 3 to transmit on PUCCH resource 1 and select or activate beam 4 to transmit on PUCCH resource 2. The UE could deactivate beam 1 and beam 2 in response to the measurement or the beam report. PUCCH: Whether Replacement of Activated Beam is Applied to all or Some of PUCCH Resource The UE could select/activate a number of new beam(s) for (mapping to) a PUCCH resource for PUCCH transmission, e.g., based on at least one of a beam report, a beam quality, or whether the UE is configured with multi-TRP operation (for PUCCH). The number of the new beam(s) could be the same as the number of previous beams mapped to the PUCCH resource. The number of new beam(s) may not be (or is not allowed to be) different from the number of the previous beam(s) mapped to the PUCCH resource.

Additionally and/or alternatively, the number of the new beam(s) could (only) be one.

Additionally and/or alternatively, the number of the new beams could be different from the number of previous beams mapped to the PUCCH resource.

Additionally and/or alternatively, the number of the new beams may not be larger than the number of previous beams mapped to the PUCCH resource.

Additionally and/or alternatively, the number of the new beams may not be smaller than the number of previous beams mapped to the PUCCH resource.

For example, a UE could be indicated by a network with 2 PUCCH resources for a BWP of a Cell. A first PUCCH resource could be associated with or mapped to 2 previous beams (indicated by 2 TCI state ids or 2 spatial relation info IDs). The UE could trigger or initiate a beam report for the (BWP or the) Cell (e.g., initiate periodically or via network indication or UE-initiated). The UE could obtain beam quality of one or more beams (including the 2 beams associated with the first PUCCH resource). The UE could determine which beams to replace based on the beam quality of the one or more beams. The UE could select or activate (at most) 2 new beams for mapping to the first PUCCH resource (e.g., based on beam quality of the 2 new beams is higher than a threshold or are highest among the one or more beams). Additionally and/or alternatively, the UE could select or activate 1 new beam for mapping to the first PUCCH resource (e.g., based on beam quality of the 1 new beam is higher than a threshold or is the highest among all measured beams).

Additionally, a second PUCCH resource could be associated with or mapped to 1 (single) previous beam (indicated by 1 TCI state id or 1 spatial relation info ID). The UE could select or activate 1 (single) new beam for mapping to the second PUCCH resource (e.g., based on beam quality of the new beam is higher than a threshold or is the highest among the one or more beams). Additionally and/or alternatively, the UE could select or activate 2 new beams for mapping to the second PUCCH resource. Alternatively, the UE may not (or is not allowed to) select or activate 2 new beams for mapping to the second PUCCH resource (since the second PUCCH resource is associated with only one previous beam).

Change Only One PUCCH Resource (Based on Index or Based on Beam Quality)

Additionally and/or alternatively, the UE could activate or select a new beam (TCI state or spatial relation) for a single activated PUCCH resource for each beam report. The UE could determine to which PUCCH resource to activate or select a new beam based on index/ID (e.g., lowest index or ID) of the PUCCH resource or beam quality associated with beams of the PUCCH resource.

For another example, a UE could be indicated by a network with 2 PUCCH resource (for a BWP of a Cell). A first PUCCH resource could be associated with a first previous beam (indicated by first TCI state id or a first spatial relation info ID), and a second PUCCH resource could be associated with a second previous beam (indicated by second TCI state id or a second spatial relation info ID). The UE could initiate or trigger a beam report and perform measurement on one or more beams (including the first previous beam and the second previous beam). According to the beam report or measurement, the first previous beam has the lowest beam quality among beams associated with PUCCH resources. Additionally and/or alternatively, the first previous beam has a beam quality lower than a threshold. The UE could select and/or activate a first new beam for the first PUCCH resource. The UE could deactivate the first previous beam in response to the beam report.

The UE may not switch/select and/or activate the second previous beam for the second PUCCH resource. According to the beam report or measurement, the second previous beam has a beam quality lower than a threshold. The second previous beam has a beam quality higher than beam quality of the first previous beam.

Additionally and/or alternatively, the UE may not select or activate 2 beams associated with the same TRP of a Cell for an PUCCH resource. The UE could select or activate 2 beams associated with different TRPs of a Cell for a PUCCH resource for the (BWP of the) Cell.

Select the Beam with Same TRP as the Previous Beam Only

Additionally and/or alternatively, the UE could select a new beam for transmitting a PUCCH (among the one or more PUCCH resource), wherein the new beam may not be associated with a different TRP than a previous beam used to transmit the PUCCH resource. The UE could select a new beam associated with the same TRP as the previous beam. The UE may not (be allowed to) select a new beam associated with different TRP from that associated with the previous beam. The new beam could be associated with or be detected/derived with a beam quality higher than or equal to a threshold. Additionally and/or alternatively, the new beam could be associated with the same CORESET pool as the previous beam.

PUSCH: Configured Grant Beam

Additionally and/or alternatively, the UE could select or activate beam for PUSCH in response to a beam report or a beam quality.

The UE could determine whether to select or activate one or more beam(s) for transmitting PUSCH (of a cell or a BWP of the Cell) for one or more configured grant, based on at least a beam report or a beam quality associated with the one or more beam(s). Additionally and/or alternatively, the UE could determine whether to deactivate second one or more beam(s) associated with the configured grant based on beam report or beam quality associated with the one or more beam(s).

Additionally and/or alternatively, the UE could select a new beam for transmitting a PUSCH or a configured grant (among the one or more PUSCH resource), wherein the new beam may not be associated with a different TRP than a previous beam used to transmit the PUSCH resource or configured grant. The UE could select a new beam associated with the same TRP as the previous beam. The UE may not (be allowed to) select a new beam associated with different TRP from that associated with the previous beam. The new beam could be associated with or be detected/derived with a beam quality higher than or equal to a threshold. Additionally and/or alternatively, the new beam could be associated with the same CORESET pool as the previous beam.

Additionally and/or alternatively, the UE may not select or activate 2 beams associated with the same TRP of a Cell for a PUSCH resource (or for a configured grant). The UE could select or activate 2 beams associated with different TRPs of a Cell for a PUSCH resource (or for a configured grant) for the (BWP of the) Cell.

The one or more beams could be associated with Sounding Reference Signal (SRS) resource (e.g., indicated by srs-Resourceindicator).

The one or more beams could be reciprocal with the SRS resource.

The one or more beam(s) could be associated with a (type-1 and/or type-2) configured grant.

Content of Report for UE-Initiated Beam Selection

The UE could transmit a beam selection report to the network in response to switching/selection and/or activation of one or more beam(s), wherein the switching/selecting and/or activation of the one or more beams is in response to a beam report or in response to beam quality. The switching/selection and/or activation of the one or more beam(s) could be initiated or triggered by the UE (itself). Beam report mentioned above could be the beam selection report.

The beam selection report could be contained in the same signaling (MAC CE, PUCCH, or Radio Resource Control (RRC) message) as periodic, aperiodic, or event-triggered beam report. The beam selection report could be different signaling from beam report. The beam selection report could be a beam report associated with configuration (e.g., CSI-reportConfig) configured by the network. For example, the beam selection report could be a same CSI report as the CSI report that the UE based on to select/activate beam for UL/DL channel(s). Alternatively, the beam selection report could be a different message from the CSI report. For another example, the beam selection report could be a beam report (mentioned above), wherein the beam report is a MAC CE. The beam selection report could be transmitted with a CSI report, measurement report or a beam report.

The beam selection report could include or indicate channel(s) associated with the selected/activated one or more beam(s). For example, the beam selection report could contain a field indicating channel(s) for which the one or more beam(s) is selected and/or activated. Additionally and/or alternatively, the field could indicate UL and/or DL channels for which the one or more beam(s) is selected and/or activated. Additionally and/or alternatively, a field could indicate whether the one or more beam(s) is selected and/or activated for DL channel(s) (only) or for UL channel(s) (only) or for both DL and UL channel(s).

Additionally and/or alternatively, the UE could use different format of beam selection report for reporting selection/activation of one or more beam(s) of different channels. For example, the UE could use different MAC CEs, each has a unique Logical Channel ID (LCID) for different channels.

The beam selection report could include or indicate some or all of the following information and/or may not include or indicate some of the following information:

One or more Cells associated with the selected/activated one or more beam(s). For example the beam selection report could include one or more Serving Cell index associated with the selected/activated one or more beam(s). Additionally and/or alternatively, the beam selection report could indicate one or more list of cells (e.g., simultaneousTCI-UpdateList1 or simultaneousTCI-UpdateList2) associated with the selected/activated one or more beam(s).

One or more BWPs (e.g., BWP ID) associated with the selected/activated one or more beam(s).

One or more CORESETs (e.g., CORESET ID) associated with the selected/activated one or more beam(s).

One or more CORESET pools (e.g., CORESET pool ID) associated with the selected/activated one or more beam(s).

One or more codepoints (e.g., of a field in DCI scheduling) for PDSCH associated with the selected/activated one or more beam(s).

One or more PUCCH resources (e.g., PUCCH resource ID) associated with the selected/activated one or more beam(s).

One or more TCI states (e.g., TCI state ID) associated
with the selected/activated one or more beam(s).

One or more spatial relation info (e.g., spatial relation info
ID) associated with the selected/activated one or more
beam(s).

One or more TCI states (e.g., TCI state ID) associated
with the one or more beam(s) that the UE decides/
determines to deactivate/change based on beam mea-
surement/beam report.

PDCCH Selection Report

An example for reporting selection/activation of beam(s)
for PDCCH (e.g., a PDCCH beam selection report) is shown
in FIG. 15. The beam selection report could contain an id of
a Serving Cell (e.g., serving cell index). The beam selection
report could indicate CORESET associated with beam selec-
tion/activation (e.g., via CORESET id, CORESETID1). The
UE could indicate a beam selected/activated for correspond-
ing CORESET via TCI state ID associated with the beam. In
FIG. 15A, the UE could report more than one CORESET for
a PDCCH. Each of the more than one CORESET could be
associated with a TCI state. Alternatively, A TCI state ID
indicated in the report could be associated with or mapped
to more than one CORESET. In FIG. 15B, the UE could
report more than one Serving Cell and more than one
CORESET for multiple PDCCHs in different Cells. In FIG.
15C, the UE could report more than one BWP for a Serving
Cell (via indicating BWP ID). In FIG. 15D, the UE could
report one or more CORESET pool indexes. Each of the one
or more CORESET pool indexes could be associated with a
TCI state ID. In FIG. 15E, the UE may not report CORESET
id or CORESET pool index for activation/selection of beams
for a Cell. The UE select/activates a TCI state (TCI state id
1) or a beam for all CORESETs of the indicated Cell.

PDSCH Selection Report

An example for reporting selection/activation of beam(s)
for PDSCH (e.g., a PDSCH beam selection report) is shown
in FIG. 16, where the beam selection report could contain an
id of a Serving Cell (e.g., serving cell index). The beam
selection report could contain id of a BWP (e.g., BWP ID).
The beam selection report could contain a bitmap (T1, T2,
. . . to $T_{N+3}$) indicating which beam(s) are selected/activated.
Each bit of the bitmap could be associated with a TCI state.
For example, the UE could set T1 to 1 indicating that beam
associated with TCI state id 1 is selected/activated. The UE
could set T2 to 0 indicating that beam associated with TCI
stat ID is not selected or is not activated. Another example
is shown in FIG. 16A, where the beam selection report could
indicate one or two activated/selected beam for each acti-
vated TCI state codepoint. The beam selection report could
contain c field indicating whether a TC codepoint is asso-
ciated with one or two activated/selected beam. For
example, C0 is set to 1 indicating two beams associated with
the next two TCI state ids (TCI state id1 and TC state id 2)
are activated/selected for TCI codepoint 0. C2 set to 0
indicating one beam associated with next TCI state id (TCI
state id 5) is activated/selected for TCI codepoint 2. Another
example is shown in FIG. 16B, where the beam selection
report could contain or indicate a codepoint id. The beam
selection report could indicate a single codepoint. The UE
could activate/select one or more TCI state (indicated via C
field) for the single codepoint. Alternatively or additionally,
the beam selection report could indicate one or more code-
point(s) and one or more TCI state(s) for each of the one or
more codepoint(s).

The response or acknowledgement from the network
could include MAC CE indicating activation of one or more
beams for DL and/or UL channel(s). The response or acknowledgement could include activation of one or more
beams for CORESETs associated with or indicated in beam
selection report. The response or acknowledgement could
include activation of one or more beams for TCI codepoint
indicated in beam selection report. The UE may not consider
a signaling (indicating activation of one or more beams for
DL and/or UL channel(s)) to be the response or acknowl-
edgement of a beam selection report when or if the signaling
does not contain or indicate same CORESET, PUCCH
resource, or TCI codepoint as indicated in beam selection
report.

The response or acknowledgement from the network
could be an indication (e.g., MAC CE) from the network to
deactivate one or more cells associated with the beam
selection report.

The response or acknowledgement from the network
could be an indication (e.g., DCI) from the network to
switch a BWP associated with the beam selection report.

PUCCH Selection Report

An example for reporting PUCCH beam activation/selec-
tion is shown in FIG. 17. The beam selection report could
indicate one or two activated/selected beam for each
PUCCH resource. The beam selection report could contain
C field indicating whether a PUCCH resource is associated
with one or two activated/selected beam. For example, C1 is
set to 1 indicating two beams associated with next two TCI
state ids (TCI state id1 and TCI state id 2) or Spatial relation
info IDs are activated/selected for PUCCH resource ID 1.
C2 set to 0 indicating one beam associated with next TCI
state id (TCI state id 3) or Spatial relation info ID is
activated/selected for PUCCH resource ID 2. Another
example is shown in FIG. 17A, where the beam selection
report could contain a bitmap (S1 to S7) indicating activated
beam(s) associated with PUCCH resource ID1. The beam
selection report could contain a single PUCCH resource ID.

The beam selection report could be a MAC CE or a
physical layer signaling or a RRC message.

The response or acknowledgement from the network
could include MAC CE indicating activation of one or more
beams for DL and/or UL channel(s). The response or
acknowledgement could include activation of one or more
beams for CORESETs associated with or indicated in the
beam selection report. The response or acknowledgement
could include activation of one or more beams for TCI
codepoint indicated in the beam selection report. The UE
may not consider a signaling (indicating activation of one or
more beams for DL and/or UL channel(s)) to be the response
or acknowledgement of a beam selection report when or if
the signaling does not contain or indicate same CORESET,
PUCCH resource, or TCI codepoint as indicated in the beam
selection report.

The response or acknowledgement from the network
could be an indication (e.g., MAC CE) from the network to
deactivate one or more cells associated with the beam
selection report.

The response or acknowledgement from the network
could be an indication (e.g., DCI) from the network to
switch a BWP associated with the beam selection report.

Additionally and/or alternatively, the beam selection
report could contain or indicate one or more currently
activated beam(s) and one or more new beam(s) to replace
the one or more currently activated beam(s). The UE could
activate the one or more new beam(s) for CORESET(s)
associated with the one or more currently activated beam(s).
Additionally and/or alternatively, the UE could activate or
apply the one or more new beam(s) for TCI codepoint(s)
associated with the one or more currently activated beam(s).

Additionally and/or alternatively, the UE could activate or apply the one or more new beam(s) for PUCCH/PUCCH resources and/or PUSCH associated with the one or more currently activated beam(s). Different beams in the beam selection report could be associated with the same TRP or different TRPs.

Discontinuous Reception (DRX) for Monitoring Network ACK

In response to triggering the transmission of the beam selection report (e.g., beam selection report trigger is pending), the UE could trigger a Scheduling Request, e.g., when the UE has no UL grant to transmit the beam selection report.

The beam selection report trigger could be cancelled when the UE receives an indication (e.g., MAC CE) from the network to deactivate one or more cells associated with the beam selection report. The beam selection report trigger could be cancelled when the UE receives an indication (e.g., DCI) from the network to switch a BWP associated with the beam selection report. The beam selection report trigger could be cancelled when the UE resets a MAC entity for one or more cells associated with the beam selection report. The beam selection report trigger could be cancelled when the UE triggers a Beam Failure Recovery (BFR) for one or more cells associated with the beam selection report. The beam selection report trigger could be cancelled when the UE initiates a random access procedure for beam failure recovery for one or more cells associated with the beam selection report.

In response to the transmission of the beam selection report, the UE (configured with DRX) monitors PDCCH (for response from the network for the beam selection report). Additionally and/or alternatively, the UE considers itself to be in (DRX) active time or stays in active time in response to transmission of the beam selection report. Additionally and/or alternatively, the active time of the UE could include the time when a response or acknowledgement (e.g., DCI or MAC CE) associated with the beam selection report has not been received from the network after transmission of the beam selection report.

Additionally and/or alternatively, the UE considers itself to be in (DRX) active time or stays in active time in response to triggering the transmission of the beam selection report (e.g., beam selection report trigger is pending). Additionally and/or alternatively, the active time could include the time when a response or acknowledgement (e.g., DCI or MAC CE) associated with the beam selection report has not been received from the network after triggering of the beam selection report.

The response or acknowledgement from the network could include MAC CE indicating activation of one or more beams for DL and/or UL channel(s). The response or acknowledgement could include activation of one or more beams for CORESETs associated with or indicated in beam selection report. The response or acknowledgement could include activation of one or more beams for TCI codepoint indicated in beam selection report. The UE may not consider a signaling (indicating activation of one or more beams for DL and/or UL channel(s)) to be the response or acknowledgement of a beam selection report when or if the signaling does not contain or indicate same CORESET, PUCCH resource, or TCI codepoint as indicated in beam selection report.

The response or acknowledgement from the network could be an indication (e.g., MAC CE) from the network to deactivate one or more cells associated with the beam selection report.

The response or acknowledgement from the network could be an indication (e.g., DCI) from the network to switch a BWP associated with the beam selection report.

Unified TCI State

Alternatively and/or additionally, the UE could determine whether a/the first one or more beam(s) is used for DL channel, UL channel, or both DL channel and UL channel, based on at least whether reciprocity between DL channel and UL channel and/or whether there is a mismatch between DL channel and UL channel and/or whether there is a maximum permitted exposure (MPE) issue. In response to detecting no reciprocity between DL channel and UL channel, or mismatch between DL channel and UL channel, or MPE issue, the UE may determine the first one or more beam(s) used for DL channel and/or UL channel separately, or the first one or more beam(s) could be associated to a TCI (state) type for DL channel or UL channel, separately. In response to detecting reciprocity between DL channel and UL channel, or match between DL channel and UL channel, or no MPE issue, the UE may determine the first one or more beam(s) used for both DL and UL channel, or the first one or more beam(s) could be associated to a TCI (state) type for DL channel and UL channel (which is a joint TCI state). For reporting the first one or more beam(s) to the gNB, the format for delivering/carrying/indicating the first one or more beam(s) could comprise information of serving cell, TCI state ID. One example is shown in FIG. 15E. The format could comprise one or more serving cell IDs and one or more TCI state IDs. Preferably in various embodiments, the one or more TCI state IDs could associate to a TCI state type. The TCI state type could be DL only, UL only, joint for DL and UL If there is cell group or simultaneous beam update, the beam or TCI state associated to a serving cell may apply or update for at least the serving cell and one or more cells associated to the serving cell (e.g., intra-band carrier aggregation (CA) cells, or be configured with simultaneously beam update cell). Preferably in various embodiments, the UE could update or apply or activate one or more beams (associated to TCI state) associated to the first one or more beam(s).

Preferably in various embodiments, the UE may receive a first set of DL channels or signals via at least one beam from the first one or more beam(s). Preferably in various embodiments, the UE may transmit a second set of UL channels or signals via at least one beam from the first one or more beam(s). Preferably in various embodiments, the first set of DL channels or signals comprise UE-specific or UE-dedicated DL channels or signals. Preferably in various embodiments, the first set of DL channels or signals does not comprise non-UE-specific or non-UE-dedicated DL channels or signals. Preferably in various embodiments, the second set of UL channels or signals comprise UE-specific or UE-dedicated UL channels or signals. Preferably in various embodiments, the second set of UL channels or signals does not comprise non-UE-specific or non-UE-dedicated channels or signals.

Preferably in various embodiments, the first set of DL channel or signal comprises PDCCH, PDSCH or CORESET associated to UE-specific search space sets (USS), and/or DL channel or signal scrambled by Cell Radio Network Temporary Identifier (C-RNTI), Configured Scheduling-RNTI (CS-RNTI), or Modulation Coding Scheme-RNTI (MCS-RNTI). Preferably in various embodiments, the first set of DL channels or signals DOES NOT comprise PDCCH, PDSCH or CORESET associated to common search space sets (CSS), and/or DL channels or signals scrambled by System Information RNTI (SI-RNTI), Random Access RNTI (RA-RNTI), Paging RNTI (P-RNTI). Preferably in various embodiments, the first set of DL channels or signals comprise DL channels or signals which are configured by dedicated RRC signaling. Preferably in various embodiments, the first set of DL channels or signals does not comprise DL channels or signals which are configured by common or cell-specific RRC signaling. Preferably in various embodiments, the first set of DL channels or signals do not comprise DL channels or signals which are configured by System Information Block (SIB) or system information.

In one embodiment, the UE could be configured with a plurality of TCI states associated to one or more reference signals, respectively. Each of the plurality of TCI state is associated to one or more beams. Each of the plurality of TCI states is associated to one TCI state type. One TCI state type could be for DL channel only, UL channel only, joint for DL and UL channel. In response to detecting (current/active) beam quality is lower than a threshold, the UE could select a first one or more beam(s) from the plurality of TCI states. The UE may, based on at least beam quality associated to one or more reference signals in the plurality of TCI states, determine the first one or more beam(s) (e.g., beam with quality higher than a threshold, or the UE may determine from beam with highest beam quality). The UE may (further) determine whether there is reciprocity between DL and UL channel, based on beam quality between one DL Reference Signal (RS) and one UL RS, or whether the UE performs maximum power reduction associated to one UL RS or one beam. For example, if beam quality of one DL RS is higher than beam quality of one UL RS, the UE may determine there is no reciprocity. For another example, if the UE performs maximum power reduction associated to one UL RS or one beam, the UE may identify that there is no reciprocity between DL and UL channel. In response to MPE or no reciprocity between DL and UL channel, the UE may select the first one or more beams based on TCI state associated to DL channel only, or UL channel only. In other words, the UE is not allowed to select the first one or more beams based on TCI state associated to joint TCI state. When the gNB receives the reported first one or more beam(s) from the UE, the gNB could know how to adjust or indicate UE with proper beam.

For example, the gNB confirmation/acknowledge message in response to the (reported) first one or more beams could be indicate beam update for DL and/or UL channel, separately, based on the first one or more beam(s) (if the first one or more beam(s) are associated to TCI state associated to DL channel only, UL channel only). For another example, the gNB confirmation/acknowledge message in response to the (reported) first one or more beams could indicate beam update for DL and UL channel, jointly, based on the first one or more beam(s) (if the first one or more beam(s) are associated to TCI state associated to joint (DL and UL)). In response to the gNB confirmation/acknowledge message, the UE could update or apply new/update beam based on at least one of the (reported) first one or more beam(s). Preferably, the UE may update or apply new/update beam based on at least one of the (reported) first one or more beam(s) (further) based on the gNB confirmation/acknowledge message.

Preferably in various embodiments, the gNB confirmation/acknowledge message may comprise information related to apply/update which beam among the first one or more beam(s). For example, the gNB confirmation/acknowledge message may be a PDCCH, MAC CE. For example, the gNB confirmation/acknowledge message may be a bit map associated to the reported first one or more beam(s), respectively. The bit map with one or more bits with value 1 provides the UE with information related to apply/update which beam. For example, if the first one or more beam is (beam_x, beam_y, beam_z, beam_w). Preferably in various embodiments, each of beam_x, beam_y, beam_z, beam_w could associate to TCI state for joint DL and UL, TCI state for DL only, TCI state for UL only. Preferably in various embodiments, the gNB confirmation/acknowledge message could be a 4-bit bit-map. Preferably in various embodiments, the least significant bit (ISB) of the bit map is associated to the first beam/TCI state among the first one or more beam(s). Alternatively, the most significant bit (MSB) of the bit map is associated to the first beam/TCI state among the first one or more beam(s). In one example, {0100} could be one example of the gNB confirmation/acknowledge message that confirms applying beam_y. In one example, {0101} could be one example of the gNB confirmation/acknowledge message that confirms applying beam_y and beam_w. For the first one or more beam(s) associated to separate TCI state (e.g., DL only, or UL only), if the gNB confirmation/acknowledge message is associated to only DL beam or UL beam, the UE may (only) apply/update beam only for DL or UL For the first one or more beam(s) associated to separate TCI states (e.g., DL only, or UL only), if the gNB confirmation/acknowledge message is associated to one only DL beam and one UL beam (these two are associated to different beams), the UE may (only) apply/update beam for DL (based on the gNB confirmation/acknowledge message) and apply/update beam for UL (based on the gNB confirmation/acknowledge message). In another example, {0000} could be one example of the gNB confirmation/acknowledge message that the gNB refuses this beam switching suggested by the UE, and/or the UE may trigger to report another first one or more beam(s) (in response to the gNB's refusing).

Preferably in various embodiments, based on the first one or more beam(s), the UE could provide information of whether a single TRP or multiple TRP is preferred. For example, the UE may report the first one or more beam(s) with information related to whether to apply a single TRP or multiple TRPs. For another example, the UE may report more than one DL beam among the first one or more beam(s) for indicating suggested multiple TRP operation.

Preferably in various embodiments, based on the gNB confirmation/acknowledge message, the UE may determine whether single TRP or multiple TRP is applied. If the gNB confirmation/acknowledge message indicates at least two beams for DL, the UE may identify that multiple TRP operation is applied for DL reception. If the gNB confirmation/acknowledge message indicates only one beam for DL, the UE may identify that single TRP operation is applied for DL reception. If the gNB confirmation/acknowledge message indicates at least two beams for UL, the UE may identify that multiple TRP operation is applied for UL transmission. If the gNB confirmation/acknowledge message indicates only one beam for UL, the UE may identify that single TRP operation is applied for UL transmission. If the gNB confirmation/acknowledge message indicates two beams associated to two joint TCI states (for DL and UL), the UE may identify that multiple TRP operation is applied for DL reception and UL transmission. If the gNB confirmation/acknowledge message indicates only one beam associated to joint TCI states (for DL and UL), the UE may identify that single TRP operation is applied for DL reception and UL transmission. If the gNB confirmation/acknowledge message indicates one beam associated to joint TCI states (for DL and UL) and one beam associated to TCI state separate for DL, the UE may identify that multiple TRP operation is applied for DL reception and single TRP operation for UL transmission. If the gNB confirmation/acknowledge message indicates one beam associated to joint TCI states (for DL and UL) and one beam associated to TCI state separate for UL, the UE may identify that multiple TRP operation is applied for UL transmission and single TRP operation for DL reception.

If the gNB confirmation/acknowledge message indicates one beam associated to DL and one beam associated to UL, the UE may identify that single TRP operation is applied for DL reception and single TRP operation for UL transmission.

If the gNB confirmation/acknowledge message indicates two beams associated to DL and one beam associated to UL, the UE may identify that multiple TRP operation is applied for DL reception and single TRP operation for UL transmission.

If the gNB confirmation/acknowledge message indicates one beam associated to DL and two beams associated to UL, the UE may identify that single TRP operation is applied for DL reception and multiple TRP operation for UL transmission.

If the gNB confirmation/acknowledge message indicates two beams associated to DL and two beams associated to UL, the UE may identify that multiple TRP operation is applied for DL reception and multiple TRP operation for UL transmission.

Preferably, (for a hybrid beam update method), the second concept above is applied for UE-specific or dedicated DL/UL channels or signals and the first concept above is applied for non-UE-specific or non-dedicated DL/UL channels or signals. For example, the first concept could be used for PDSCH/PDCCH/PUSCH/PUCCH/Reference Signal (RS) associated to common RNTI or configured by SIB or system information. For example, the second concept could be used for PDSCH/PDCCH/PUSCH/PUCCH/RS associated to UE-specific RNTI (e.g., C-RNTI, CS-RNTI, MCS-RNTI) or configured by dedicated RRC signal.

Any combination of the below concepts, teachings, or embodiments can be jointly combined with the embodiments and disclosure above and herein or formed to a new embodiment.

The one or more beams could be associated with one or more reference signals. Each of the one or more beams could be associated with a reference signal (e.g., Synchronization Signal Block (SSB) or CSI-RS).

Additionally and/or alternatively, the one or more beam(s) could be associated with one or more TCI states or a spatial relations. The UE could select and/or activate one or more TCI state(s) in response to one or more beam qualities associated with the one or more TCI state(s).

Additionally and/or alternatively, the beam could be associated with a (UL or DL) panel. The beam quality could be associated with channel quality of a channel associated with the UE. The beam quality could be associated with a RSRP and/or Reference Signal Received Quality (RSRQ) and/or Received Signal Strength Indicator (RSSI) and/or SINR associated with the beam.

The beam report could be CSI reporting.

The beam report could be associated with SRS transmission.

The beam report could be L1-RSRP reporting.

The beam report could be L1-SINR reporting.

The beam report could be associated with a report setting (e.g., CSI-ReportConfig of a BWP configured by the network).

The beam report could be periodic or aperiodic (e.g., based on network indication).

The UE could trigger the beam report based on (events of) measured beam quality. For example, the UE could trigger a beam report when or if beam quality of an activated beam is lower than beam quality of a deactivated/unused beam by an offset. Additionally and/or alternatively, the UE could trigger a beam report when or if beam quality of an activated beam is lower than a first threshold and beam quality of a deactivated/unused beam is higher than a second threshold.

The beam report could be associated with a measurement report (e.g., a L3-filtered measurement report).

The beam report could include or indicate one or more beams (e.g., reference signal index or TCI state id).

The beam report could include one or more activated or selected beams. The UE could include activated or selected beams in the beam report.

The UE could activate or select one or more beams reported or measured in the (beam) measurement.

The UE could transmit the beam report to the network via RRC message, MAC CE, or PUCCH or PUSCH signaling.

The UE could transmit the beam selection report to the network via RRC message, MAC CE, or PUCCH or PUSCH signaling.

The beam report mentioned above could be the beam selection report.

The beam selection report may not result in TRP switching of a (or any) Cell of the UE.

The UE could select/activate one or more beam(s) for a (same) CORESET for each Cell in a same list (e.g., simultaneousTCI-UpdateList1) associated with a Cell indicated by the beam report.

The UE could select/activate one or more beam(s) for a (same) codepoint of PDSCH for each Cell in a same list (e.g., simultaneousTCI-Updatelist1) associated with a Cell indicated by the beam report.

The UE could select/activate one or more beam(s) for a (same) PUCCH resource of PUCCH for each Cell in a same list (e.g., simultaneousTCI-UpdateList1) associated with a Cell indicated by the beam report.

The UE could select/activate one or more beam(s) for a (same) PUSCH for each Cell in a same list (e.g., simultaneousTCI-UpdateList1) associated with a Cell indicated by the beam report.

The beam report could include or indicate beam quality of one or more beams.

The beam quality could be measured or obtained by UE via beam measurement.

The beam quality could be (L1/3) RSRP and/or (L1/L3) RSRQ and/or (L1/L3) SINR and/or RSSI.

The beam quality could be provided by or measured via the beam report.

The beam quality could contain RSRP/RSRQ and/or SINR and/or RSSI for one or more beam(s).

The Cell could be an activated or deactivated Serving Cell.

The Cell could be a primary Cell or a Secondary Cell.

The (one or more) beams could be SSB or CSI-RS.

The (one or more) beams could be associated with or indicated by or substituted by TC state (e.g., beams configured in a TCI state of a TCI state id).

The (one or more) beams could be a TCI state or associated with a TCI state ID. To activate a beam, the UE could activate TCI state(s) associated with the beam or consider the TCI state associated with the beam to be activated.

The beam could be associated with a spatial relation. To activate a beam, the UE could activate spatial relation(s)

associated with the beam or consider the spatial relation(s) associated with the beam to be activated.

The one or more beam(s) activated for a channel in response to or based on a beam report or beam quality could be (partially) the same as one or more previous beam(s) that is activated before the beam report or measurement of the beam quality.

The previous beams could contain (a part of) same beams as (a part of) the new beams.

The UE may not deactivate the previous beam in response to selecting a new beam for a Channel in response to beam report of beam quality. The UE could deactivate the previous beam in response to receiving a confirmation or positive feedback associated with the beam report from a network. Alternatively, the UE could deactivate the previous beam in response to selecting or activating the new beam for the Channel.

The UE could perform single TRP operation or multi-TRP operation on the Cell.

The TRP mentioned above could be associated with or replaced by a SRS resource or a PUSCH resource. To transmit a Transport Block (TB) to a TRP, the UE transmits via a SRS resource or a PUSCH resource associated with the TRP.

A TRP mentioned above could be associated with or replaced by a (group of) beam failure detection reference signal(s) (BFD-RS) associated with a cell (e.g., a serving cell or a non-Serving Cell). For a UE in single-TRP state on a cell, the UE could receive or monitor a single (group of) beam failure detection reference signal associated with the cell. For a UE in inter-Cell multi-TRP state on a Serving Cell and a non-Serving Cell, the UE could receive or monitor two or more (group of) beam failure detection reference signals associated with the Serving cell and the non-Serving Cell. When a TRP of a cell is removed for the UE, the UE could release, remove, or stop monitoring a (group of) beam failure detection reference signal(s) (associated with the TRP).

Additionally and/or alternatively, a TRP mentioned above could be associated with or replaced by a (group of) activated TCI states (for PDCCH monitoring) associated with a cell (e.g., a serving cell or a non-Serving Cell). For a UE in single-TRP state on a cell, the UE could receive or monitor same signaling (e.g., PDCCH or PDSCH signaling) of the cell via a single activated TCI state. For a UE in inter-Cell multi-TRP state on a Serving Cell and a non-Serving Cell, the UE could receive or monitor one or more same signaling (e.g., PDCCH or PDSCH signaling) of the cell via two or more activated TCI states (at a same time). When a TRP of a cell is removed for the UE, the UE could deactivate an activated TCI state (associated with the TRP). For a UE in inter-Cell multi-TRP state on a Serving Cell and a non-Serving Cell, the UE could transmit one or more same signaling (e.g., PUCCH or PUSCH signaling) of the cell via two or more activated TCI states (at a same time). When a TRP of a cell is removed for the UE, the UE could deactivate an activated TCI state (associated with the TRP). Each of the two or more activated TCI states could be associated with different Cells.

The one or more same signaling could indicate a same downlink assignment or uplink grant for the UE. The UE could combine the one or more same signaling to derive a downlink assignment or uplink grant. Each signaling in the one or more same signaling could contain the same content (e.g., same DCI).

Additionally and/or alternatively, a TRP mentioned above could be associated with or replaced by a CORESET pool associated with a cell. For a UE in single-TRP state on a cell, the UE could receive or monitor signaling from the cell via a single CORESET pool (e.g., only one activated CORESET pool or configured CORESET pool index, or without configured CORESET pool index for CORESET(s) on the cell). For a UE in inter-Cell multi-TRP state on a Serving Cell and a non-Serving Cell, the UE could receive or monitor signaling from the cell via two or more CORESET pools (e.g., two or more activated CORESET pools or configured CORESET pool indexes). When a TRP of a cell is removed for the UE, the UE could deactivate or release a CORESET pool (index) (associated with the TRP). Each of the two or more activated CORESET pools could be associated with different Cells.

Additionally and/or alternatively, a TRP mentioned above could be associated with or replaced by a SRS resource (set) associated with a cell. For a UE in single-TRP state on a cell, the UE could perform transmission to the cell via a single SRS resource. For a UE in inter-Cell multi-TRP state on a Serving Cell and a non-Serving Cell, the UE could perform transmission to the cell via two or more SRS resources. When a TRP of a cell is removed for the UE, the UE could deactivate or release a SRS resource (set) (associated with the TRP). Each of the two or more SRS resources could be associated with different Cells.

Any combination of above concepts can be jointly combined or formed to a new embodiment. The following embodiments can be used to solve at least (but not limited to) the issues mentioned above.

Referring to FIG. 18, with this and other concepts, systems, and methods of the present invention, a method 1000 for a UE in a wireless communication system comprises monitoring PDCCH on a first CORESET on a first Cell via a first reference signal (step 1002), obtaining beam quality associated with at least the first reference signal and a second reference signal (step 1004), initiating or triggering a beam report (step 1006), and in response to the initiating, the triggering, or a transmission of the beam report, selecting or activating a second reference signal for monitoring PDCCH on the first CORESET (step 1008).

In various embodiments, the UE triggers and/or transmits a beam selection report to a network in response to the selecting or the activating of the second reference signal.

In various embodiments, the UE deactivates the first reference signal in response to the selecting or the activating of the second reference signal.

In various embodiments, the UE receives an acknowledgement from the network associated with the beam selection report, wherein the UE activates the second reference signal for monitoring PDCCH in response to the acknowledgement.

In various embodiments, the UE determines to select or activate the second reference signal based on the beam quality of the second reference signal higher than or equal to a threshold.

In various embodiments, the UE determines to select or activate the second reference signal based on the beam quality of the second reference signal is higher than the beam quality of the first reference signal.

In various embodiments, the UE determines to select or activate the second reference signal based on the beam quality of the second reference signal is higher than a first threshold and the beam quality of the first reference signal is lower than a threshold.

In various embodiments, the UE activates or selects the second reference signal for monitoring PDCCH on a second Cell in response to the beam report, wherein the first Cell and the second Cell is associated with or configured in a simultaneous update TCI state Cell list.

In various embodiments, the beam report is triggered, by the UE, in response to beam quality of the first reference signal being smaller than a threshold.

In various embodiments, the beam report is triggered, by the UE, in response to beam quality of the first reference signal being smaller than beam quality of the second reference signal by an offset value.

Referring back to FIGS. 3 and 4, in one or more embodiments from the perspective of a UE, the device 300 includes a program code 312 stored in memory 310 of the transmitter. The CPU 308 could execute program code 312 to: (i) monitor PDCCH on a first CORESET on a first Cell via a first reference signal, (ii) obtain beam quality associated with at least the first reference signal and a second reference signal, (iii) initiate or trigger a beam report, and (iv) in response to the initiating, the triggering, or a transmission of the beam report, select or activate a second reference signal for monitoring PDCCH on the first CORESET. Moreover, the CPU 308 can execute the program code 312 to perform all of the described actions, steps, and methods described above, below, or otherwise herein.

Referring to FIG. 19, with this and other concepts, systems, and methods of the present invention, a method 1010 for a UE in a wireless communication system comprises receiving PDSCH on a first Cell via a first reference signal and a second reference signal, wherein the first reference signal and the second reference signal are mapped to a first TCI codepoint for PDSCH (step 1012), initiating a beam report, wherein the UE obtains beam quality associated with at least the first reference signal, the second reference signal, and a third reference signal via the beam report (step 1014), and in response to the initiating or a transmission of the beam report, selecting or activating the third reference signal for monitoring PDSCH on the first CORESET (step 1016).

In various embodiments, the UE maps the third reference signal to the first TCI codepoint for PDSCH in response to the beam report.

In various embodiments, the UE triggers or transmits a beam selection report to a network in response to the selecting or the activating of the third reference signal.

In various embodiments, the UE activates the third reference signal in response to receiving an acknowledgement associated with the beam selection report from the network.

In various embodiments, the UE maps the third reference signal to the first codepoint in response to receiving an acknowledgement associated with the beam selection report from the network.

In various embodiments, the beam report is triggered, by the UE, in response to one or both beam quality of the first reference signal and/or the second reference signal is smaller than a threshold.

In various embodiments, the beam report is triggered, by the UE, in response to beam quality of the first reference signal and/or the second reference signal is smaller than beam quality of the third reference signal by an offset value.

In various embodiments, the UE maps the third reference signal to other codepoints for PDSCH for the first Cell in response to the beam report.

In various embodiments, the UE activates or selects the third reference signal for monitoring PDSCH on a second Cell in response to the beam report, wherein the first Cell and the second Cell is associated with or configured in a simultaneous update TCI state Cell list.

Referring back to FIGS. 3 and 4, in one or more embodiments from the perspective of a UE, the device 300 includes a program code 312 stored in memory 310 of the transmitter. The CPU 308 could execute program code 312 to: (i) receive PDSCH on a first Cell via a first reference signal and a second reference signal, wherein the first reference signal and the second reference signal are mapped to a first TCI codepoint for PDSCH, (ii) initiate a beam report, wherein the UE obtains beam quality associated with at least the first reference signal, the second reference signal, and a third reference signal via the beam report, and (iii) and in response to the initiating or a transmission of the beam report, select or activate the third reference signal for monitoring PDSCH on the first CORESET. Moreover, the CPU 308 can execute the program code 312 to perform all of the described actions, steps, and methods described above, below, or otherwise herein.

Referring to FIG. 20, with this and other concepts, systems, and methods of the present invention, a method 1020 for a UE in a wireless communication system comprises receiving PDSCH on a first Cell via a first reference signal and a second reference signal, wherein the first reference signal and the second reference signal are mapped to a first TCI codepoint for PDSCH (step 1022), initiating a beam report, wherein the UE obtains beam quality associated with at least the first reference signal, the second reference signal, a third reference signal and a fourth reference signal via the beam report (step 1024), and in response to the beam report, selecting or activating the third reference signal and the fourth reference signal for monitoring PDSCH on the first CORESET (step 1026).

In various embodiments, the UE maps the third reference signal and the fourth reference signal to the first TC codepoint for PDSCH in response to the beam report.

In various embodiments, the UE triggers or transmits a beam selection report to a network in response to the selecting or the activating of the third reference signal and the fourth reference signal.

In various embodiments, the UE activates the third reference signal and the fourth reference signal in response to receiving an acknowledgement associated with the beam selection report from the network.

In various embodiments, the UE maps the third reference signal and the fourth reference signal to the first codepoint in response to receiving an acknowledgement associated with the beam selection report from the network.

In various embodiments, the UE activates and/or selects a fifth reference signal and a sixth reference signal, wherein the UE maps a fifth reference signal and a sixth reference signal to a second codepoint in response to the beam report.

In various embodiments, the beam report is triggered, by the UE, in response to one or both beam quality of the first reference signal and/or the second reference signal is smaller than a threshold.

In various embodiments, the beam report is triggered, by the UE, in response to beam quality of the first reference signal and/or the second reference signal is smaller than beam quality of the third reference signal and/or the fourth reference signal by an offset value.

In various embodiments, the UE maps the third reference signal and the fourth reference signal to other codepoints for PDSCH for the first Cell in response to the beam report.

In various embodiments, the UE activates or selects the third reference signal and the fourth reference signal for monitoring PDSCH on a second Cell in response to the beam report, wherein the first Cell and the second Cell is associated with or configured in a simultaneous update TCI state Cell list.

In various embodiments, the beam quality is RSRP/RSRQ/SINR/RSSI.

In various embodiments, the reference signal(s) are associated with TCI state(s).

In various embodiments, the reference signal(s) are SSB or CSI-RS(s).

In various embodiments, the reference signal(s) are associated with SRS resources.

In various embodiments, the reference signal(s) are associated with spatial relations.

In various embodiments, the beam report is a periodic beam report.

In various embodiments, the beam report is an aperiodic beam report.

In various embodiments, the beam report is triggered, by the UE, without indication by a network.

In various embodiments, the beam selection report is associated with the beam report, or the beam selection report contains information associated with the beam report.

Referring back to FIGS. 3 and 4, in one or more embodiments from the perspective of a UE, the device 300 includes a program code 312 stored in memory 310 of the transmitter. The CPU 308 could execute program code 312 to: (i) receive PDSCH on a first Cell via a first reference signal and a second reference signal, wherein the first reference signal and the second reference signal are mapped to a first TCI codepoint for PDSCH, (ii) initiate a beam report, wherein the UE obtains beam quality associated with at least the first reference signal, the second reference signal, a third reference signal and a fourth reference signal via the beam report, and (iii) in response to the beam report, select or activate the third reference signal and the fourth reference signal for monitoring PDSCH on the first CORESET. Moreover, the CPU 308 can execute the program code 312 to perform all of the described actions, steps, and methods described above, below, or otherwise herein.

Referring to FIG. 21, with this and other concepts, systems, and methods of the present invention, a method 1030 for a UE in a wireless communication system comprises monitoring a first set of DL channels or signals based on a first TCI state, wherein the first set of DL channels or signals comprises a first CORESET on a first Cell (step 1032), obtaining beam quality associated with at least a first reference signal (associated to the first TCI state) and a second reference signal (associated to a second TCI state) (step 1034), initiating or triggering a beam report (step 1036), and in response to the initiating, the triggering, or a transmission of the beam report, selecting or activating a second reference signal for monitoring the first set of DL channels or signals or monitoring the first set of DL channels or signals based on the second reference signal (step 1038).

Preferably in various embodiments, the first set of DL channels or signals comprises a second CORESET on a second Cell.

Preferably in various embodiments, the UE could be configured with a plurality of TCI states, wherein the plurality of TCI states comprises the first TCI state and the second TCI state, and/or the plurality of TCI states is used for receiving/monitoring the first set of DL channels or signals or transmitting the second set of UL channels or signals.

Preferably in various embodiments, the first TCI state, the second TCI state is associated to a TC state type, respectively.

Preferably in various embodiments, the TC state type could be DL only, UL only, or joint DL and UL Preferably in various embodiments, if the TC state type for the first TCI state is DL only, the UE transmits a second set of UL channels or signal based on a third reference signal different than the first reference signal and/or the third reference signal does not associate to the first TC state.

Preferably in various embodiments, if the TC state type for the first TCI state is joint DL and UL, the UE transmits a second set of UL channels or signals based on the first reference signal.

Preferably in various embodiments, if the UE identifies a MPE issue or there is no channel reciprocity between DL and UL channel, the UE is not allowed or does not select the second TCI state from the plurality of TCI states and the second TCI state is associated to TCI state type "joint".

Preferably in various embodiments, if the UE does not identify a MPE issue or there is channel reciprocity between DL and UL channel, the UE could select the second TCI state from the plurality of TCI states and the second TCI state is associated to TCI state type "joint" or "DL only" or "UL only".

Preferably in various embodiments, in response to the initiating, the triggering, or a transmission of the beam report, selecting or activating a second reference signal for transmitting the second set of UL channels or signaling or transmitting the second set of UL channels or signals based on a second reference signal.

Preferably in various embodiments, if the UE identifies a MPE issue or there is no channel reciprocity between DL and UL channel, the UE (could) select the second TCI state from the plurality of TCI states and the second TC state is associated to TCI state type "DL only" and selects a fourth TC state from the plurality of TCI states and the fourth TCI state is associated to TCI state type "UL only".

Preferably in various embodiments, in response to the initiating, the triggering, or a transmission of the beam report, monitoring the first set of DL channels or signals based on the (updated or activated) second reference signal (associated to the second TC state) and transmitting the second set of UL channels or signals based on the (updated or activated) fourth reference signal (associated to the fourth TCI state).

Preferably in various embodiments, transmission or reception via or based on a reference signal may mean or imply or comprise transmission or reception via beam associated to the reference signal, or the reference signal could provide Quasi Co-Location (QCL) type-D information or spatial relation information for transmission or reception.

Preferably in various embodiments, for the first TCI state associated to TCI state type "joint DL and UL" and the second TC state associated to TCI state type "DL only", in response to the initiating, the triggering, or a transmission of the beam report, reference signal for transmitting the second set of UL channels or signals is different than reference signal for monitoring/receiving the first set of DL channels or signals.

Preferably in various embodiments, for the first TCI state associated to TCI state type "DL only" and the second TC state associated to TCI state type "joint DL and UL", in response to the initiating, the triggering, or a transmission of the beam report, reference signal for transmitting the second set of UL channels or signals is the same as reference signal for monitoring/receiving the first set of DL channels or to signals.

Referring back to FIGS. 3 and 4, in one or more embodiments from the perspective of a UE, the device 300 includes a program code 312 stored in memory 310 of the transmitter. The CPU 308 could execute program code 312 to: (i)

monitor a first set of DL channels or signals based on a first TC state, wherein the first set of DL channels or signals comprises a first CORESET on a first Cell, (ii) obtain beam quality associated with at least a first reference signal (associated to the first TC state) and a second reference signal (associated to a second TCI state), (iii) initiate or trigger a beam report, and (iv) in response to the initiating, the triggering, or a transmission of the beam report, select or activate a second reference signal for monitoring the first set of DL channels or signals or monitoring the first set of DL channels or signals based on the second reference signal. Moreover, the CPU 308 can execute the program code 312 to perform all of the described actions, steps, and methods described above, below, or otherwise herein.

Referring to FIG. 22, with this and other concepts, systems, and methods of the present invention, a method 1040 for a UE in a wireless communication system comprises monitoring PDCCH on multiple CORESETs in a first cell (step 1042), transmitting a signaling to a network, wherein the signaling indicates information of a first beam (step 1044), and monitoring PDCCH on the multiple CORESETs via the first beam based on the signaling (step 1046).

In various embodiments, the UE receives PDSCH and/or transmits PUCCH in the first cell via the first beam based on the signaling, and/or the information of the first beam is TCI state for downlink reception, and/or the information of the first beam is TC state for uplink transmission.

In various embodiments, the UE monitors PDCCH on the multiple CORESETs via the first beam in response to, or when receiving a response or acknowledgment associated with, the signaling from the network, or in response to, or when transmitting, the signaling.

In various embodiments, the UE transmits the signaling periodically or based on a request from the network.

In various embodiments, the signaling indicates beam quality of the first beam.

In various embodiments, the multiple CORESETs are all CORESETs configured for a first TRP of the first cell, and/or the multiple CORESETs are CORESETs with a first value of CORESETPoolIndex associated with the first TRP of the first cell.

In various embodiments, beam quality of the first beam is higher than a threshold, and/or the beam quality of the first beam is highest among all beams indicated in the signaling.

In various embodiments, the UE transmits the signaling when beam quality of at least one second beam is lower than a threshold, wherein the UE monitors PDCCH on the multiple CORESETs via the at least one second beam before transmitting the signaling and/or the UE transmits the signaling when beam quality of at least one candidate beam is higher than a second threshold, and wherein the at least one candidate beam comprises the first beam.

In various embodiments, the signaling provides association or mapping between the first beam and the multiple CORESETs, and/or the signaling indicates an associated direction for the first beam (e.g., DL/UL beam), one or more associated channels or signals for the first beam, and/or an associated TRP for the first beam In various embodiments, the UE monitors PDCCH on second multiple CORESETs via a third beam based on the signaling, wherein the signaling also indicates information of the third beam.

In various embodiments, the signaling provides association or mapping between the third beam and the second multiple CORESETs, and/or the signaling indicates an associated direction for the third beam (e.g., DL/UL beam), one or more associated channels or signals for the third beam, and/or an associated TRP for the third beam.

In various embodiments, the second multiple CORESETs are all CORESETs configured for a second TRP of a second cell, and/or a CORESET with a second value of CORESETPoolIndex is associated with the second TRP of the second cell, and/or the first cell is the same or different than the second cell which means Physical Cell ID (PCI) of the first cell is the same or different than the PCI of the second cell.

Referring back to FIGS. 3 and 4, in one or more embodiments from the perspective of a UE, the device 300 includes a program code 312 stored in memory 310 of the transmitter. The CPU 308 could execute program code 312 to: (i) monitor PDCCH on multiple CORESETs in a first cell, (ii) transmit a signaling to a network, wherein the signaling indicates information of a first beam, and (iii) monitor PDCCH on the multiple CORESETs via the first beam based on the signaling. Moreover, the CPU 308 can execute the program code 312 to perform all of the described actions, steps, and methods described above, below, or otherwise herein.

Referring to FIG. 23, with this and other concepts, systems, and methods of the present invention, a method 1050 for a UE in a wireless communication system comprises monitoring PDCCH on at least one CORESET via a second beam in a first cell (step 1052), transmitting a signaling to a network, wherein the signaling indicates information of a first beam and indicates the at least one CORESET or information of the second beam (step 1054), and monitoring PDCCH on the at least one CORESET via the first beam based on the signaling (step 1056).

In various embodiments, the UE receives PDSCH and/or transmits PUCCH in the first cell via the first beam based on the signaling.

In various embodiments, the UE monitors PDCCH on the at least one CORESET via the first beam in response to, or when receiving a response or acknowledgment associated with, the signaling from the network, or in response to, or when transmitting, the signaling.

In various embodiments, beam quality of the first beam is higher than a threshold, and/or the beam quality of the first beam is highest among all beams indicated in the signaling.

In various embodiments, the UE transmits the signaling when beam quality of the second beam is lower than a threshold.

In various embodiments, the UE monitors PDCCH on at least one second CORESET via a third beam based on the signaling, wherein the signaling also indicates the third beam and indicates the at least one second CORESET, or a fourth beam used for monitoring PDCCH on the at least one second CORESET, before transmitting the signaling.

In various embodiments, the signaling provides association or mapping between the first beam and the at least one CORESET, and/or the signaling indicates an associated direction for the first beam (e.g., DL/UL beam), one or more associated channels or signals for the first beam, and/or an associated TRP for the first beam.

Referring back to FIGS. 3 and 4, in one or more embodiments from the perspective of a UE, the device 300 includes a program code 312 stored in memory 310 of the transmitter. The CPU 308 could execute program code 312 to: (i) monitor PDCCH on at least one CORESET via a second beam in a first cell, (ii) transmit a signaling to a network, wherein the signaling indicates information of a first beam and indicates the at least one CORESET or information of the second beam, and (iii) monitor PDCCH on the at least one CORESET via the first beam based on the signaling. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:
monitoring Physical Downlink Control Channel (PDCCH) on multiple Control Resource Sets (CORE-SETs) in a first cell;

transmitting a signaling to a network, wherein the signaling includes a reference signal index associated with a first beam and a second reference signal index associated with a third beam;

monitoring PDCCH on the multiple CORESETs via the first beam based on the signaling; and monitoring PDCCH on second multiple CORESETs via the third beam based on the signaling.

2. The method of claim 1, wherein the UE receives Physical Downlink Shared Channel (PDSCH) and/or transmits Physical Uplink Control Channel (PUCCH) in the first cell via the first beam based on the signaling.

3. The method of claim 1, wherein the UE monitors PDCCH on multiple CORESETs via the first beam in response to, or when receiving a response or acknowledgment associated with, the signaling from the network, or in response to, or when transmitting, the signaling.

4. The method of claim 1, wherein the UE transmits the signaling periodically or based on a request from the network.

5. The method of claim 1, wherein the signaling indicates beam quality of the first beam, and wherein the beam quality is Reference Signal Received Power (RSRP).

6. The method of claim 1, wherein the multiple CORESETs are all CORESETs configured for a first Transmission/Reception Point (TRP) of the first cell, and/or the multiple CORESETs are CORESETs with a first value of CORESETPoolIndex associated with the first TRP of the first cell.

7. The method of claim 1, wherein beam quality of the first beam is higher than a threshold, and/or the beam quality of the first beam is highest among all beams indicated in the signaling.

8. The method of claim 1, wherein the UE transmits the signaling when beam quality of at least one second beam is lower than a threshold, wherein the UE monitors PDCCH on the multiple CORESETs via the at least one second beam before transmitting the signaling and/or the UE transmits the signaling when beam quality of at least one candidate beam is higher than a second threshold, and wherein the at least one candidate beam comprises the first beam, and/or the UE transmits the signaling when beam quality of the first beam is higher than beam quality of a second beam by an offset value, wherein the UE monitors PDCCH on the multiple CORESETs via the second beam before transmitting the signaling.

9. The method of claim 1, wherein the signaling provides association or mapping between the first beam and the multiple CORESETs, and/or the signaling indicates an associated direction for the first beam, one or more associated channels or signals for the first beam, and/or an associated TRP for the first beam.

10. The method of claim 1, wherein the signaling provides association or mapping between the third beam and the second multiple CORESETs, and/or the signaling indicates an associated direction for the third beam, one or more associated channels or signals for the third beam, and/or an associated TRP for the third beam.

11. The method of claim 1, wherein the second multiple CORESETs are all CORESETs configured for a second TRP of a second cell, and/or a CORESET with a second value of CORESETPoolIndex is associated with the second TRP of the second cell, and/or the first cell is the same or different than the second cell which means Physical Cell Identity (PCI) of the first cell is the same or different than the PCI of the second cell.

12. A method of a User Equipment (UE), comprising:

monitoring Physical Downlink Control Channel (PDCCH) on first multiple Control Resource Sets (CORESETs) via a second beam and second multiple CORESETs via a fourth beam in a first cell;

transmitting a signaling to a network, wherein the signaling includes a reference signal index associated with a first beam and includes a second reference signal index associated with a third beam; and based on the signaling:

monitoring PDCCH on the first multiple CORESETs via the first beam;

monitoring PDCCH on the second multiple CORESETs via the third beam; and receiving Physical Downlink Shared Channel (PDSCH) and/or transmitting Physical Uplink Control Channel (PUCCH) in the first cell via at least the first beam.

13. The method of claim 12, wherein the first multiple CORESETs are all CORESETs configured for a first Transmission/Reception Point (TRP) of the first cell, and/or the first multiple CORESETs are CORESETs with a first value of CORESETPoolIndex associated with the first TRP of the first cell.

14. The method of claim 12, wherein the UE monitors PDCCH on the first multiple CORESETs via the first beam in response to, or when receiving a response or acknowledgment associated with, the signaling from the network, or in response to, or when transmitting, the signaling.

15. The method of claim 12, wherein beam quality of the first beam is higher than a threshold, and/or the beam quality of the first beam is highest among all beams indicated in the signaling.

16. The method of claim 12, wherein the UE transmits the signaling when beam quality of the second beam is lower than a threshold, and/or the UE transmits the signaling when beam quality of the first beam is higher than beam quality of the second beam by an offset value.

17. The method of claim 12, wherein the signaling provides an association or mapping between the first beam and the first multiple CORESETs and an association or mapping between the third beam and the second multiple CORESETs.

18. The method of claim 12, wherein the second multiple CORESETs are all CORESETs configured for a second TRP of a second cell, and/or a CORESET with a second value of CORESETPoolIndex is associated with the second TRP of the second cell, and/or the first cell is the same or different than the second cell, which means Physical Cell Identity (PCI) of the first cell is the same or different than the PCI of the second cell.

19. A User Equipment (UE), comprising:

a memory; and a processor operatively coupled to the memory, wherein the processor is configured to execute a program code to:

monitor Physical Downlink Control Channel (PDCCH) on first multiple Control Resource Sets (CORESETs) via a second beam and second multiple CORESETs via a fourth beam in a first cell;

transmit a signaling to a network, wherein the signaling includes a reference signal index associated with a first beam and includes a second reference signal index associated with a third beam; and based on the signaling:

monitor PDCCH on the first multiple CORESETs via the first beam;

monitor PDCCH on the second multiple CORESETs via the third beam; and receive Physical Downlink Shared Channel (PDSCH) and/or transmit Physical Uplink Control Channel (PUCCH) in the first cell via at least the first beam.

20. The UE of claim 19, wherein the signaling provides an association or mapping between the first beam and the first multiple CORESETs and an association or mapping between the third beam and the second multiple CORESETs.

\* \* \* \* \*

62